US008033956B2

(12) United States Patent
Takahashi et al.

(10) Patent No.: US 8,033,956 B2
(45) Date of Patent: Oct. 11, 2011

(54) HYDRAULIC CONTROL UNIT

(75) Inventors: Kyohei Takahashi, Kariya (JP); Akira Takagi, Obu (JP)

(73) Assignee: Denso Corporation, Kariya (JP)

( * ) Notice: Subject to any disclaimer, the term of this patent is extended or adjusted under 35 U.S.C. 154(b) by 636 days.

(21) Appl. No.: 12/236,841

(22) Filed: Sep. 24, 2008

(65) Prior Publication Data

US 2009/0093338 A1  Apr. 9, 2009

(30) Foreign Application Priority Data

Oct. 5, 2007 (JP) .................................. 2007-262589

(51) Int. Cl.
*A01G 25/16* (2006.01)
*F16D 25/00* (2006.01)
*B60W 10/04* (2006.01)
*B60W 10/10* (2006.01)
*F16H 31/00* (2006.01)

(52) U.S. Cl. .......... 477/34; 475/127; 192/85 R; 137/625

(58) Field of Classification Search .................... 477/34; 475/120, 127, 128; 192/85 R; 137/625, 137/625.11–625.19, 625.6, 625.2, 625.61–625.66
See application file for complete search history.

(56) References Cited

U.S. PATENT DOCUMENTS

| 4,531,433 | A | * | 7/1985 | Suga ............................. 477/138 |
| 5,035,312 | A | * | 7/1991 | Asayama et al. .......... 192/85.63 |
| 6,375,591 | B1 | | 4/2002 | Wakahara et al. |
| 6,499,577 | B2 | * | 12/2002 | Kitamoto et al. .......... 192/85.63 |
| 6,772,869 | B2 | * | 8/2004 | Shiohara et al. ........... 192/109 F |

FOREIGN PATENT DOCUMENTS

| JP | 61-045157 | 3/1986 |
| JP | 09-303547 | 11/1997 |

* cited by examiner

*Primary Examiner* — Tisha Lewis
(74) *Attorney, Agent, or Firm* — Nixon & Vanderhye PC

(57) ABSTRACT

A hydraulic control system of a friction device where fail-safe is required is provided with one oil pressure switch and one pressure changeover valve. The pressure changeover valve is switched by auxiliary oil pressure based on an operation of the oil pressure control valve. When an auxiliary port communicates with an input port and the pressure changeover valve is switched to the filling determination side, the oil pressure switch is turned on and "filling determination" can be carried out. When the auxiliary port is disconnected from the input port, the pressure changeover valve is switched to the fail-safe determination side. The oil pressure switch is supplied with the same driving oil pressure as of the friction device and "fail-safe determination" can be carried out from the on/off state of the oil pressure switch.

4 Claims, 32 Drawing Sheets

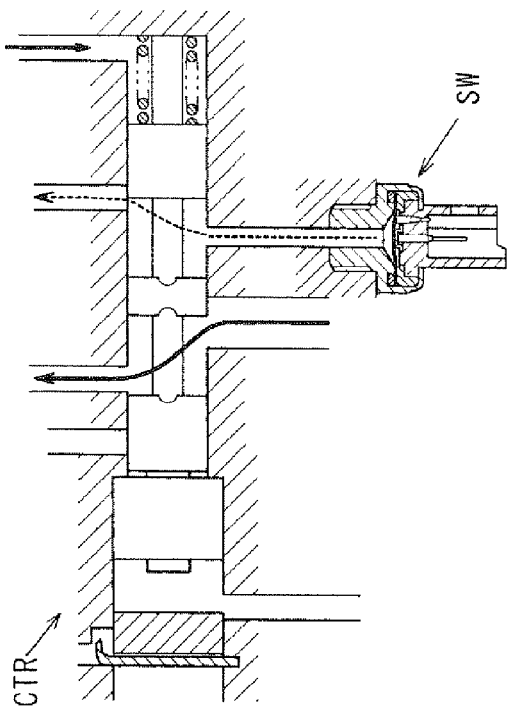
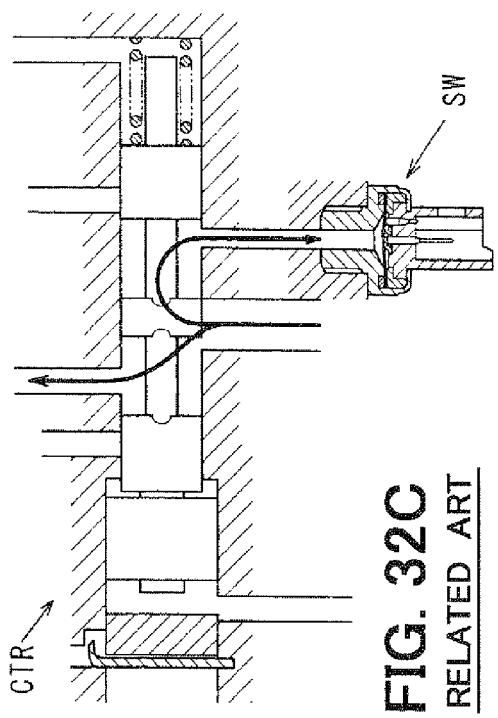
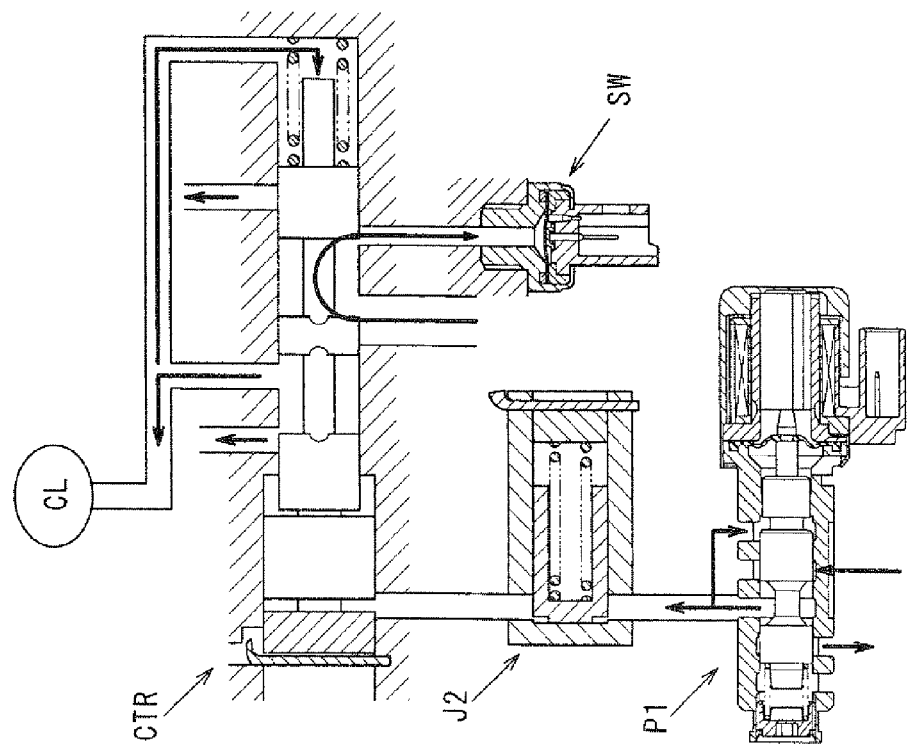
FIG. 32A RELATED ART
FIG. 32B RELATED ART
FIG. 32C RELATED ART

HYDRAULIC CONTROL UNIT

CROSS-REFERENCE TO RELATED APPLICATION

This application is based on Japanese Patent Application No. 2007-262589 filed on Oct. 5, 2007, the disclosure of which is incorporated herein by reference.

FILED OF THE INVENTION

The present invention relates to a hydraulic control unit equipped with an oil pressure control valve that generates a driving oil pressure corresponding to the displacement position of a pressure control valving element.

BACKGROUND OF THE INVENTION (Related Art 1: Mechanical Fail-Safe)

As a hydraulic control unit equipped with an oil pressure control valve that generates a driving oil pressure corresponding to the displacement position of a pressure control valving element, there are know those equipped with a "fail-safe." This fail-safe is used to avoid a problem that two hydraulically controlled objects are simultaneously supplied with driving oil pressure. (Refer to Patent Document 1, for example.)

Patent Document 1 discloses a technique to avoid a problem that multiple friction devices (examples of hydraulically controlled objects) are simultaneously supplied with driving oil pressure in the hydraulic control unit of an automatic transmission.

The automatic transmission includes multiple friction devices, such as a clutch and a brake. The automatic transmission appropriately actuates any friction device according to a vehicle running state (including the state of operation by an occupant) to attain a gear stage corresponding to the vehicle running state. Some automatic transmissions pose a problem when multiple friction devices are simultaneously engaged.

Here, friction devices that pose a problem when simultaneously engaged will be designated as first friction device CL1 and second friction device CL2; and oil pressure control valves that respectively generate driving oil pressure in the first and second friction devices CL1, CL2 will be designated as first oil pressure control valve CTR1 and second oil pressure control valve CTR2. Pilot valves for controlling the operation of the first and second oil pressure control valves CTR1, CTR2 will be designated as first pilot valve P1 and second pilot valve (not shown). (Refer to FIG. 30A)

The art disclosed in Patent Document 1 is so constructed that a fail-safe valve (changeover valve) J1 actuated by oil pressure is used to achieve "fail-safe (prevention of double engagement)" by mechanical operation.

Specifically, the art is implemented as illustrated in FIGS. 30A and 30B. That is, the fail-safe valve J1 is actuated by part of driving oil pressure supplied from the second oil pressure control valve CTR2 to the second friction device to block the oil passage running from the first pilot valve P1 to the first oil pressure control valve CTR1. (Refer to FIG. 30B) The actuation of the first oil pressure control valve CTR1 is thereby prohibited. (The first friction device CL1 is brought into a pressure exhaust state.)

The reference alphanumeral J2 found in FIG. 30A denotes a damper valve for absorbing fluctuation (so-called judder) in pilot oil pressure supplied from the first pilot valve P1 to the first oil pressure control valve CTR1.

(Problem Associated With Related Art 1)

The technique to use the fail-safe valve J1 to achieve fail-safe (prevention of double engagement) has an advantage that the technique can be implemented at a reduced cost because the cost of the fail-safe valve J1 is low.

However, this technique involves a problem. The engagement of the first friction device CL1 can be prohibited when the second friction device CL2 is engaged; however, the engagement of the second friction device CL2 cannot be prohibited when the first friction device CL1 is engaged. As mentioned above, the degree of freedom in designing an automatic transmission is reduced, and the low degree of freedom is detrimental in, for example, the recent trend to increase in the stages of automatic transmissions.

(Related Art 2: Electrical Fail-Safe)

Consequently, there have been proposed techniques to use respective oil pressure switches to electrically detect the engagement states of multiple friction devices to achieve "fail-safe." (Refer to Patent Document 2, for example.) The "engagement state of a friction device" refers to a state in which torque transmission is carried out when the friction device is a clutch and a state in which torque braking is carried out when the friction device is a brake.

In the technique disclosed in Patent Document 2, a first oil pressure switch SW1 and a second oil pressure switch SW2 are provided as illustrated in FIG. 31. The first oil pressure switch SW1 is turned on when driving oil pressure supplied to the first friction device CL1 reaches a predetermined oil pressure (threshold value). The second oil pressure switch SW2 is turned on when oil pressure supplied to the second friction device CL2 reaches a predetermined oil pressure (threshold value). TCU (Transmission Control Unit: control device) 100 controls a second pilot valve and the second oil pressure control valve CTR2 so that the following is implemented: the second friction device CL2 is brought into a pressure exhaust state when the first oil pressure switch SW1 is turned on (when the first friction device CL1 is engaged). The TCU controls a first pilot valve P1 so that the first friction device CL1 is brought into a pressure exhaust state when the second oil pressure switch SW2 is turned on (when the second friction device CL2 is engaged).

The first and second oil pressure switches SW1, SW2 are switched according to driving oil pressure supplied to the first and second friction devices CL1, CL2. When a threshold value is set so that turn-on/off of the first and second oil pressure switches SW1, SW2 is switched in the course of shifting (in the course of reengagement), the following takes place: the range in which the first oil pressure switch SW1 is turned on and the range in which the second oil pressure switch SW2 is turned on are lapped over each other, which leads to erroneous determination.

To cope with this, threshold values for turn-on/off of the first and second oil pressure switches SW1, SW2 are set to a lightly higher value to prevent the following from taking place: the first and second oil pressure switches SW1, SW2 are simultaneously turned on in the course of normal shifting (in the course of reengagement). (This slightly higher value is a pressure value obtained in a state in which the first and second friction devices CL1, CL2 are engaged. This value will be hereafter referred to as "engagement detection threshold value.")

For this reason, the first or second oil pressure switch SW1, SW2 does not serve any purpose other than carrying out the determination of fail-safe (determination of whether a friction device is engaged or disengaged).

(Related Art 3: Detection of Electrical Filling End Time)

To enhance the accuracy of automatic transmission shift control, there is demand for the detection of the filling end time of each friction device. The "filling of a friction device" refers to an operation to supply driving oil pressure to the hydraulic servo of a hydraulic actuator until immediately before a friction device starts to engage. (The time immediately before a friction device starts to engage is equivalent to a position where a piston of the hydraulic actuator starts to press against a frictional engagement portion, such as multiple discs.)

With the technique disclosed in Patent Document 2, however, the filling end time of the first or second friction device CL1, CL2 cannot be detected with the first or second oil pressure switch SW1, SW2. This is because the threshold values for the first and second oil pressure switches SW1, SW2 are set to an "engagement detection threshold value."

To cope with this, the measure illustrated in FIGS. 32A to 32C can be taken. That is, the state of communication between an input port and an oil pressure switch SW is changed according to the displacement position of the pressure control valving element in an oil pressure control valve CTR. Then the displacement position of the oil pressure control valve CTR is detected from the on/off state of the oil pressure switch SW. Thus the filling end time of the friction device CL is detected by switching of the oil pressure switch SW.

More specific description will be given. As illustrated in FIG. 32B, the oil pressure control valve CTR is so provided that the communication between the input port and the oil pressure switch SW is blocked only when the friction device CL is filled. The oil pressure control valve CTR is so provided that the oil pressure switch SW is turned off only when the friction device CL is filled.

As illustrated in FIG. 32C, the oil pressure switch SW transitions from off to on when the displacement position of the pressure control valving element is as predetermined (filling end position), and the TCU 100 can thereby detect the filling end time of the friction device.

However, the oil pressure switch SW does not serve any purpose other than detecting the filling end time of the friction device CL.

(Related Art 4)

There is demand for the provision of the function of "electrical fail-safe" described in the above section of Related Art 2 and the function of "detection of electrical filling end time" described in the above section of Related Art 3.

To provide the two functions, it is required to separately provide an oil pressure switch SW for detecting the engagement state of a friction device CL and an oil pressure switch SW for detecting time when the friction device CL is filled.

The oil pressure switch SW requires connector cost, wiring cost, and the like in addition to the cost of the oil pressure switch SW itself.

The oil pressure switch SW for detecting the engagement state of the friction device CL does not serve any purpose other than the determination of fail-safe. The oil pressure switch SW for detecting the filling end time of the friction device CL does not serve any purpose other than detecting the filling end time of the friction device CL.

To install both the function of "electrical fail-safe" and the function of "detection of electrical filling end time," a cost is increased and cost performance is significantly impaired.

(Summary of Related Arts)

To provide the following functions according to the related arts, one oil pressure switch SW is required for each function: "driving pressure detection" function for detecting the state of generation of driving oil pressure outputted from an output port (for example, the engagement state of a friction device CL); and "time detection (switching state detection)" function for detecting the displacement position of a pressure control valving element (for example, the filling end position in the displacement position of the pressure control valving element). As a result, a problem of significantly increased cost is incurred

[Patent Document 1] JP-A-9-303547
[Patent Document 2] JP-A-2001-116134

SUMMARY OF THE INVENTION

The invention has been made to solve the above problems, and it is an object of the invention to provide a hydraulic control unit wherein "detection of driving pressure related to output pressure" and "detection of time related to the displacement of a pressure control valving element" can be carried out by one oil pressure switch.

According to the present invention, the hydraulic control unit includes: an oil pressure control valve having an output port for generating a driving oil pressure corresponding to the displacement position of a pressure control valving element and, in addition, an auxiliary port for outputting an auxiliary oil pressure related to the displacement position of the pressure control valving element; an oil pressure switch actuated according to supplied oil pressure; and a pressure changeover valve that changes detected pressure between driving oil pressure outputted from the output port and auxiliary oil pressure outputted from the auxiliary port and supplies this detected pressure to the oil pressure switch.

Thus, the oil pressure detected by the oil pressure switch is changed between "driving oil pressure outputted from the output port" and "auxiliary oil pressure outputted from the auxiliary port" according to the state of switching of the pressure changeover valve.

When the oil pressure detected by the oil pressure switch is changed to "driving oil pressure outputted from the output port," the following detection can be carried out: "driving pressure detection (detection of oil pressure outputted from the output port: for example, detection of the engagement state of a friction device)" can be carried out by the oil pressure switch.

When the oil pressure detected by the oil pressure switch is changed to "auxiliary oil pressure outputted from the auxiliary port," the following detection can be carried out: "time detection (for example, detection of filling end time)" in conjunction with the displacement of the pressure control valving element can be carried out by the oil pressure switch.

A concrete example will be taken to aid in understanding. A threshold value for turn-on/off of an oil pressure switch is set to the engagement achievement oil pressure (engagement detection threshold value) of a friction device. Further, a pressure control valving element is so provided that the state of communication between an input port and an auxiliary port is changed when the displacement position of the valving element is a filling end position.

When a filling end time is detected (an example of time detection), auxiliary oil pressure outputted from the auxiliary port is supplied to the oil pressure switch by switching of the pressure changeover valve. The filling end time is detected by switching of turn-on/off of the oil pressure switch.

When the engagement state of a friction device is detected (an example of driving pressure detection), driving oil pressure outputted from the output port is supplied to the oil pressure switch by switching of the pressure changeover valve. The engagement state of the friction device is detected by switching of turn-on/off of the oil pressure switch.

As mentioned above, it is possible for one oil pressure switch to carry out "driving pressure detection" and "time detection."

According to the related arts, it is required to use two oil pressure switches to carry out "driving pressure detection" and "time detection." According to the present invention, it is possible to carry out these detections with one oil pressure switch and reduce a cost.

According to another aspect of the invention, the pressure changeover valve of the hydraulic control unit is switched according to auxiliary oil pressure outputted from the auxiliary port.

According to another aspect of the invention, the pressure changeover valve of the hydraulic control unit is switched according to driving oil pressure outputted from the output port.

According to another aspect of the invention, the pressure changeover valve of the hydraulic control unit is switched by the operation of a dedicated actuator to switching of the pressure changeover valve.

BRIEF DESCRIPTION OF THE DRAWINGS

Other objects, features and advantages of the present invention will become more apparent from the following detailed description made with reference to the accompanying drawings, in which like parts are designated by like reference numbers and in which:

FIGS. 32A to 32C are circuit diagrams of a hydraulic circuit that detects filling end time (Related Art 3).

DETAILED DESCRIPTION OF THE PREFERRED EMBODIMENTS

Figure 1:
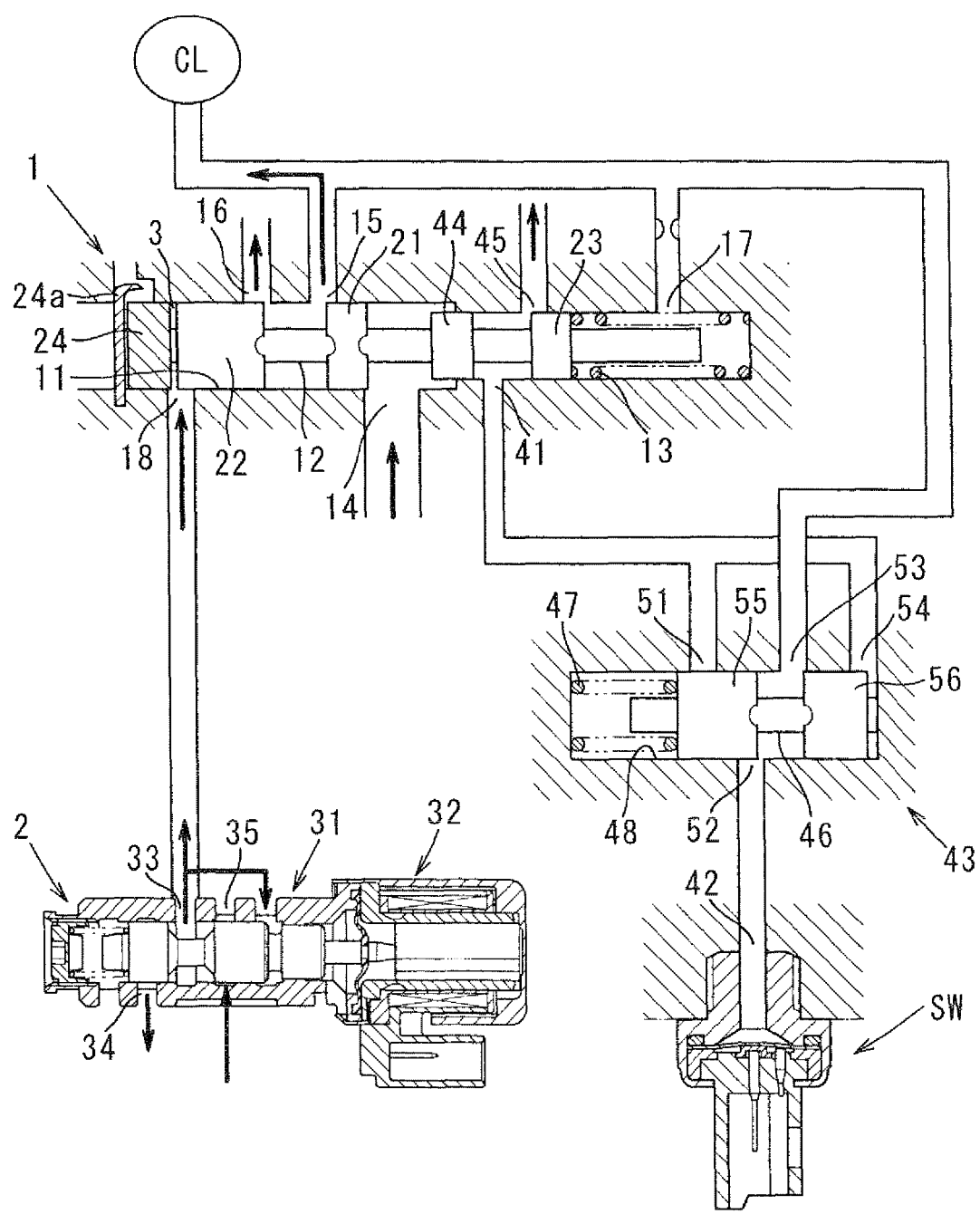
FIG. 1 is a circuit diagram of a hydraulic circuit for controlling the engagement/disengagement of a friction device (first embodiment)

The hydraulic control unit for carrying out the invention is equipped in an automatic transmission. The hydraulic control unit includes: an oil pressure control valve (for example, a spool valve) having an output port for supplying a driving oil pressure corresponding to the displacement position of a pressure control valving element (for example, a spool slidably driven in a valve body) to a friction device and further an auxiliary port that is provided separately from the output port and outputs an auxiliary oil pressure related to the displacement position of the pressure control valving element; an oil pressure switch that is actuated and turned on/off according to supplied oil pressure; and a pressure changeover valve that changes detected pressure between driving oil pressure outputted from the output port and auxiliary oil pressure outputted from the auxiliary port and supplies this pressure to the oil pressure switch and causes either the driving oil pressure or the auxiliary oil pressure to be detected at the oil pressure switch.

When auxiliary oil pressure outputted from the auxiliary port is detected at the oil pressure switch by switching of the pressure changeover valve, the state of displacement of the pressure control valving element can be detected. (For example, filling end time can be detected).

When driving oil pressure outputted from the output port is detected at the oil pressure switch by switching of the pressure changeover valve, the state of engagement/disengagement of the friction device can be detected.

First Embodiment

Description will be given to a first embodiment in which the invention is applied to the hydraulic control unit of an automatic transmission for vehicles with reference to FIG. 1 to FIG. 7.

(Basic Configuration of Hydraulic Control Unit)

The automatic transmission changes the output revolution ratio of an engine generating output for vehicle running, changes the direction of revolution, and switches between two-wheel and four-wheel according to the car model. To perform these operations, the automatic transmission is equipped with multiple friction devices CL (a multiple disc hydraulic clutch, a multiple disc hydraulic brake, and the like: only one friction device shown in the drawings). In addition, the automatic transmission includes a hydraulic control unit that controls the engagement/disengagement of the multiple friction devices CL according to a vehicle running state.

Each friction device CL is constructed of a frictional engagement portion (multiple discs and the like) and a hydraulic actuator that engages and disengages this frictional engagement portion.

To control the engagement/disengagement of each friction device CL, the hydraulic control unit controls driving oil pressure for each hydraulic actuator. The hydraulic control unit includes a hydraulic control system provided in correspondence with each hydraulic actuator and TCU (not shown) that electrically controls each hydraulic control system.

Hereafter, one of the multiple friction devices CL will be taken as an example, and description will be given to a hydraulic control system that controls driving oil pressure for this friction device CL.

Driving oil pressure supplied to the friction device CL is controlled by an oil pressure control valve 1. In the description of this embodiment, a case where the oil pressure control valve 1 is driven by pilot oil pressure received from a pilot valve 2 will be taken as an example.

The oil pressure control valve 1 includes a valve driving oil chamber 3 that receives pilot oil pressure from the pilot valve 2. In the description of this embodiment, an N/L (Normally Low)-type oil pressure control valve will be taken as an example. In this type of oil pressure control valve, the driving oil pressure of the friction device CL is exhausted when the pressure of the valve driving oil chamber 3 is exhausted. When the oil pressure of the valve driving oil chamber 3 is increased, the driving oil pressure supplied to the friction device CL is increased.

More specific description will be given. The oil pressure control valve 1 in the description of this embodiment is a spool valve having a three-way valve structure and is constructed of a pressure control shaft hole 11, a pressure control valving element 12, and a pressure control spring 13. The pressure control shaft hole 11 is a valve insertion hole formed in a valve body (the case of the hydraulic circuit) forming an oil hydraulic circuit. The pressure control shaft hole 11 supports the pressure control valving element 12 so that the valving element 12 can be slid in the axial direction. The pressure control shaft hole 11 is provided with: an input port 14 supplied with input oil pressure (oil) from an oil pump (oil pressure generating means), not shown, through an oil passage, a changeover valve, or the like; an output port 15 communicating with the friction device CL; a discharge port 16 communicating with the low pressure side (oil pan or the like); an F/B (FeedBack) port 17 for reducing part of driving oil pressure outputted from the output port 15 and supplying the reduced pressure to a spring chamber; and a valve driving port 18 that receives pilot oil pressure from the pilot valve 2. Other ports will be described later.

Oil ports, such as the input port 14, output port 15, discharge port 16, F/B port 17, and valve driving port 18, are holes formed in the side face of the pressure control shaft hole 11. In the side face of the pressure control shaft hole 11, there are formed the valve driving port 18, discharge port 16, output port 15, input port 14, and F/B port 17 in this order from the left to the right in the drawing.

The pressure control valving element 12 is a spool disposed in the pressure control shaft hole 11 so that the valving element 12 can be slid in the axial direction, and has multiple lands for switching the ports.

Description will be given to the lands provided in the pressure control valving element 12. The pressure control valving element 12 includes: an input switching land 21 for adjusting the state of communication between the input port 14 and the output port 15; and a discharge switching land 22 for adjusting the state of communication between the output port 15 and the discharge port 16. A distribution chamber communicating with the output port 15 is formed between the input switching land 21 and the discharge switching land 22.

The pressure control valving element 12 has an auxiliary land 44, described later, on the right of the input switching land 21 in the drawing and an F/B land 23 on the right side of the drawing.

Of the multiple lands, at least lands on the valve driving oil chamber 3 side (left side of the drawing) are formed with a large diameter so that the following is implemented: the pressure control valving element 12 is driven to the right of the drawing against biasing force from the pressure control spring 13 by increase in pilot oil pressure supplied to the valve driving oil chamber 3. In the first embodiment, specifically the auxiliary land 44 and the F/B land 23 are provided so that the diameters thereof are smaller than the diameters of the input switching land 21 and the discharge switching land 22.

On the right of the F/B land 23 in the drawing, there is provided the spring chamber for housing the pressure control spring 13, and the spring chamber acts as an F/B chamber communicating with the F/B port 17. The F/B port 17 communicating with the output port 15 is provided with an orifice and thus an appropriate F/B oil pressure is generated in the spring chamber acting as an F/B chamber.

For this reason, as oil pressure applied to the spring chamber (F/B chamber) is increased, axial force that displaces the pressure control valving element 12 to the left of the drawing (valve closing direction) is produced. (The oil pressure applied to the spring chamber is driving oil pressure reduced at the orifice.)

The pressure control spring 13 is a coil spring, formed in a cylindrical and spiral shape, that biases the pressure control valving element 12 to the left of the drawing (valve closing direction). The pressure control spring 13 is disposed in the spring chamber on the right of the pressure control shaft hole 11 in the drawing so that the pressure control spring is compressed.

A plug 24 is attached to the left side of the pressure control shaft hole 11 in the drawing by a stopper 24a. The plug is a means for, after the pressure control spring 13 and the pressure control valving element 12 are incorporated in the pressure control shaft hole 11, closing the left side of the pressure control shaft hole 11. The valve driving oil chamber 3 is formed between the plug 24 and the pressure control valving element 12.

The pilot valve 2 is constructed of: a pilot three-way valve 31 formed of a spool valve of three-way valve structure; and a linear solenoid 32 for driving the pilot three-way valve 31.

The pilot valve 2 described in relation to this embodiment is so constructed that the following is implemented when the linear solenoid 32 is off: the degree of communication between a pilot output port 33 communicating with the valve driving oil chamber 3 of the oil pressure control valve 1 and a pilot discharge port 34 on the drain side is increased; and the pressure of the valve driving oil chamber 3 is exhausted. In the description of this embodiment, an N/L (Normally Low)-type pilot valve will be taken as an example. In this type of pilot valve, the degree of communication between the pilot input port 35 supplied with input oil pressure (pump oil pressure) and the pilot output port 33 is increased as a current value (command current) supplied from the TCU to the linear solenoid 32 increases.

In the description of this embodiment, a spool valve is adopted as an example of the pilot three-way valve 31. The three-way valve may be one, such as a ball valve, using any other valving element shape.

The TCU is an electronic control device (computer device) that controls the automatic transmission. The TCU controls the current value (command current) of the linear solenoid 32 according to a vehicle running state by duty ratio. The TCU thereby controls pilot oil pressure to control the displacement position of the pressure control valving element 12 and thus controls driving oil pressure supplied from the output port 15 to the friction device CL.

Background of First Embodiment

As mentioned above, the automatic transmission is equipped with multiple friction devices CL. Some friction devices CL pose a problem when simultaneously engaged.

Consequently, the TCU need control the pilot valve 2 to prevent friction devices CL that pose a problem when simultaneously engaged from being simultaneously engaged.

A possible fail-safe for prohibiting simultaneous engagement is such that driving oil pressure supplied from the oil pressure control valve 1 to a friction device CL is electrically detected to detect the engagement state of the friction device CL.

To enhance the accuracy of shift control in the automatic transmission and shorten a gear shift time, there is demand for electrically detecting the filling end time of a friction device CL.

As a means for meeting the above demand, it is possible to provide an oil pressure switch SW for detecting the engagement state of a friction device CL and an oil pressure switch SW for detecting filling end time.

However, the oil pressure switch SW for detecting the engagement state of a friction device CL does not serve any purpose other than the determination of fail-safe. The oil pressure switch SW for detecting the filling end time of a friction device CL does not serve any purpose other than detecting the filling end time of the friction device CL.

For this reason, to install both the function of "electrical fail-safe" and the function of "detection of electrical filling end time," a cost is increased and cost performance is significantly impaired.

Technology Characteristic of First Embodiment

To solve the above problem, the hydraulic control unit in the first embodiment adopts the following means:

The oil pressure control valve 1 has an auxiliary port 41 for outputting an auxiliary oil pressure related to the displacement position of the pressure control valving element 12 aside from the output port 15 for generating driving oil pressure for a friction device CL.

The hydraulic control unit has an oil pressure switch SW operated according to oil pressure supplied to a detected pressure input port 42 formed in the valve body.

The hydraulic control unit has a pressure changeover valve 43. The pressure changeover valve 43 changes detected pressure between driving oil pressure outputted from the output port 15 and auxiliary oil pressure outputted from the auxiliary port 41. Then the pressure changeover valve 43 supplies this pressure to the detected pressure input port 42 of the oil pressure switch SW.

Figure 2:
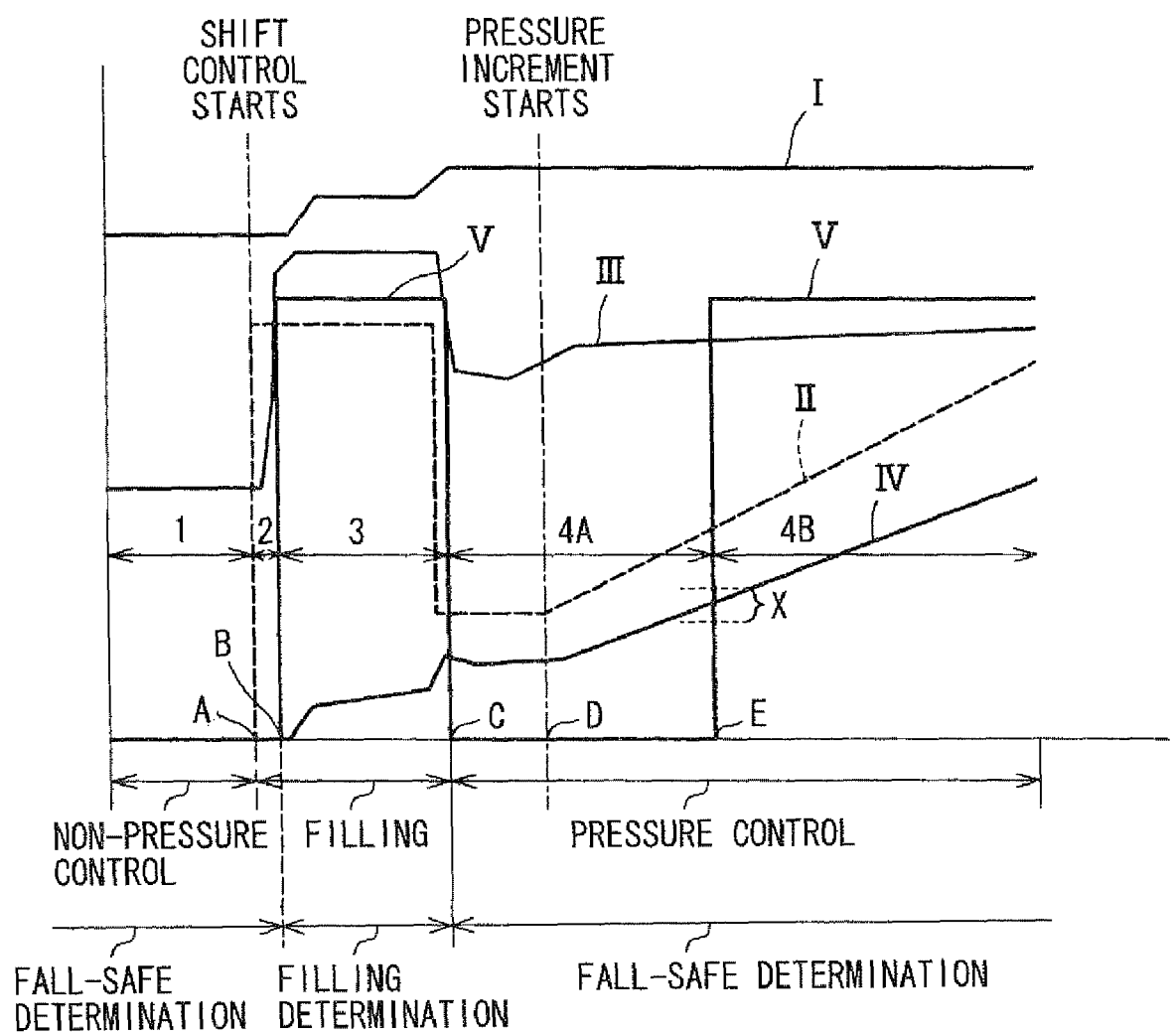
FIG. 2 is a time diagram explaining operation (first embodiment)
Figure 3:
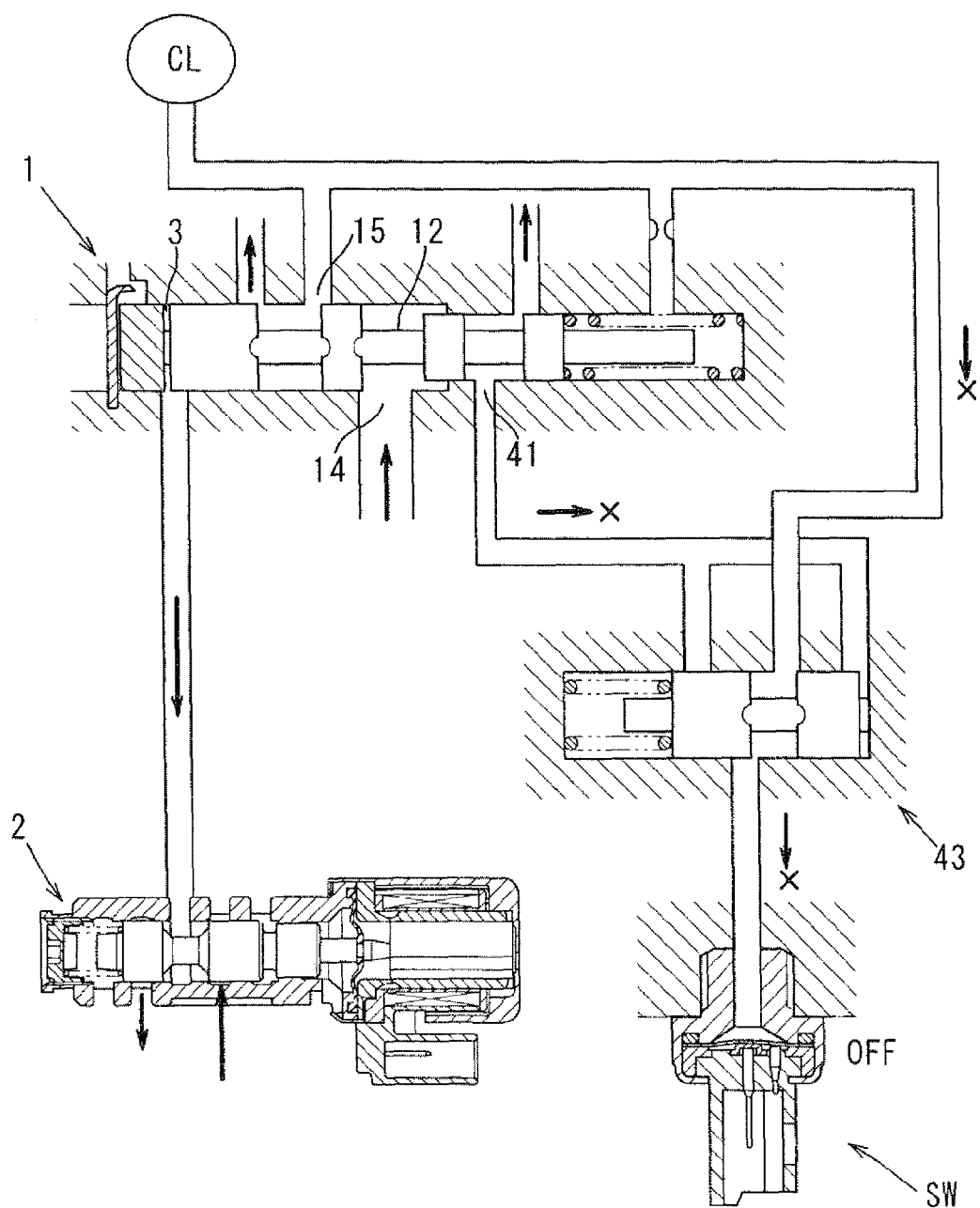
FIG. 3 is a circuit diagram of the hydraulic circuit in a stopped state (first embodiment)
Figure 4:
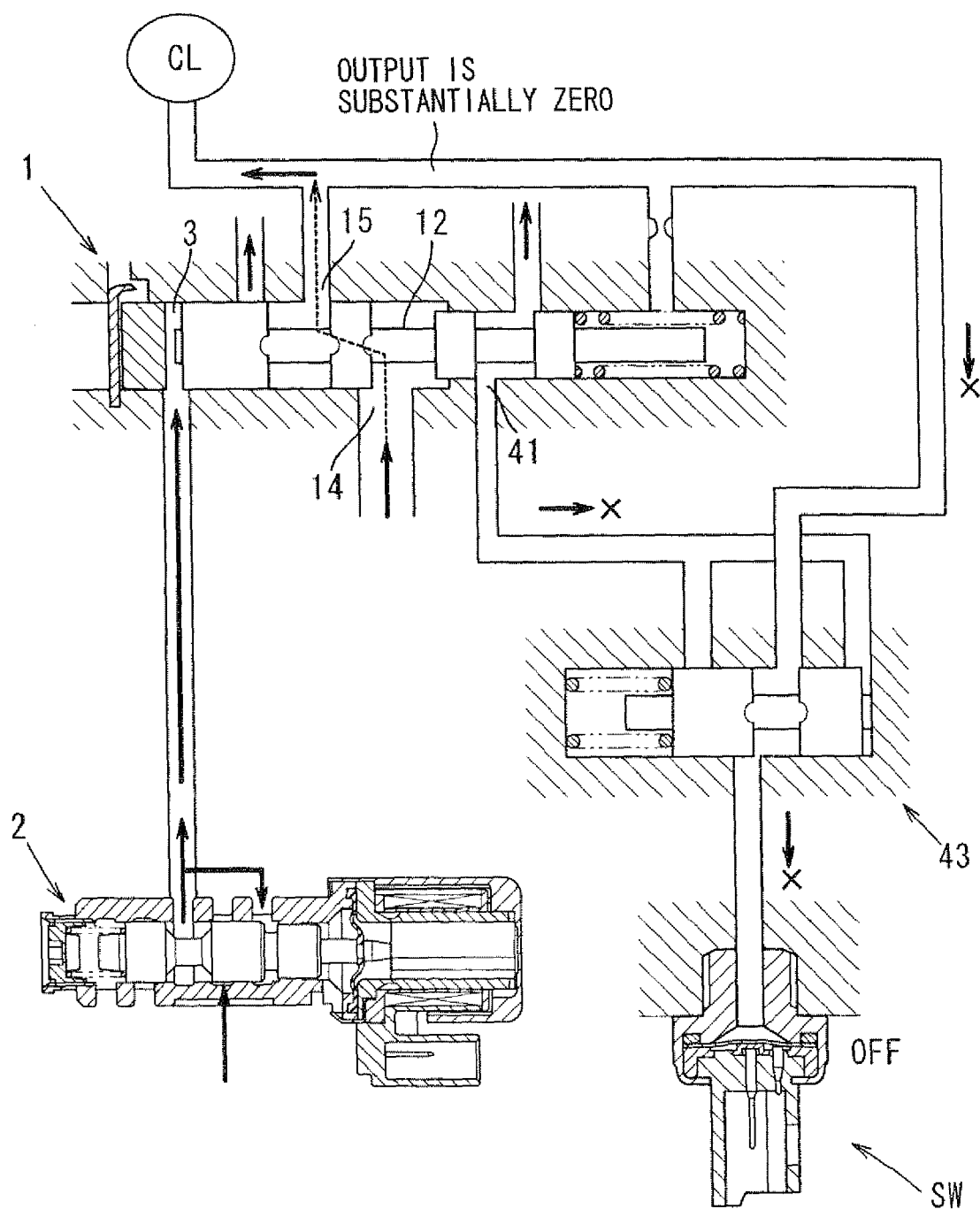
FIG. 4 is a circuit diagram of the hydraulic circuit when shift control is started (first embodiment)
Figure 5:
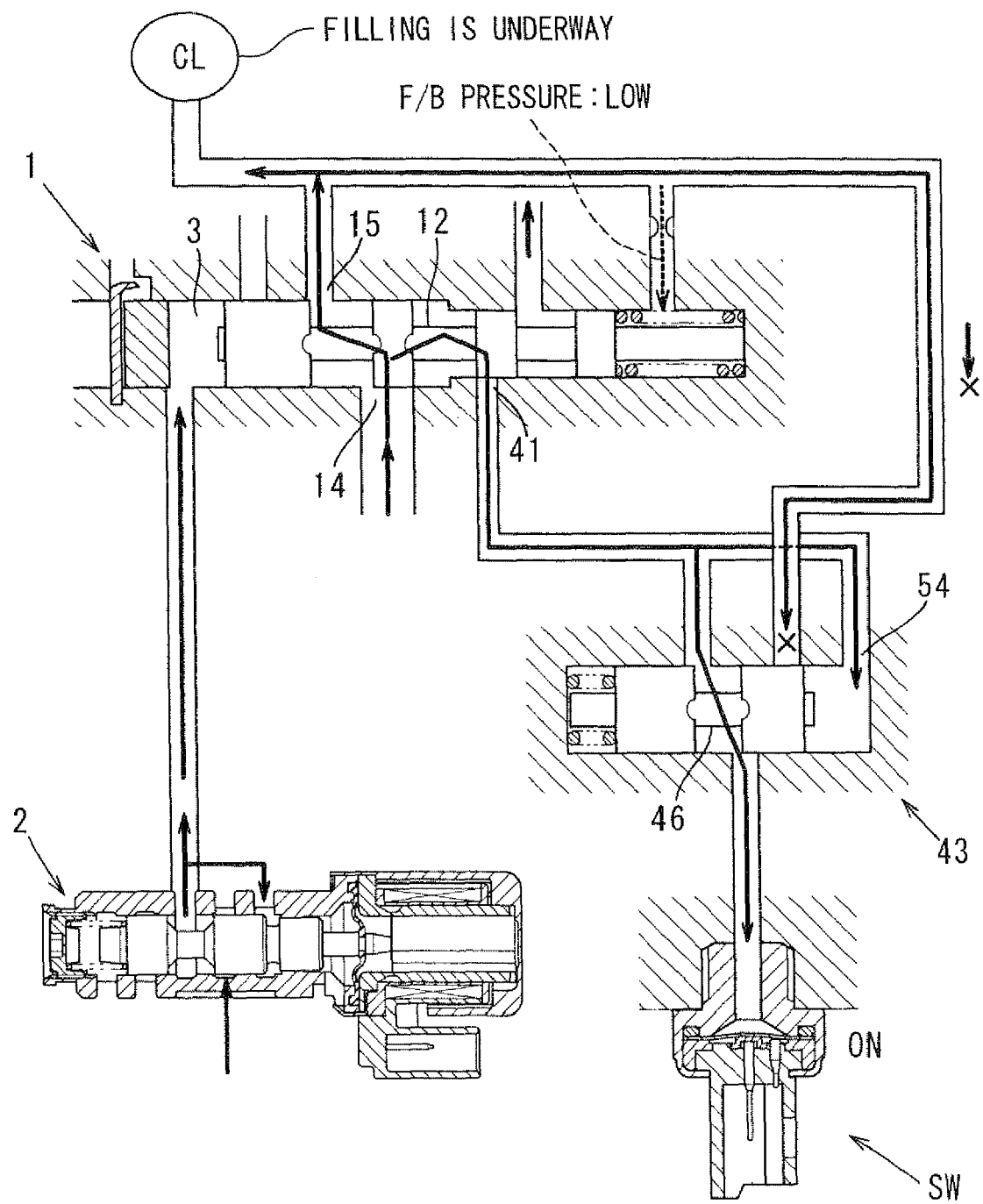
FIG. 5 is a circuit diagram of the hydraulic circuit when supply of driving oil pressure is started (first embodiment)

Description will be given to the terms found in FIG. 2 (time diagram explaining operation preformed when shift control is carried out). The "parenthesized reference alphanumerals" in the following description correspond to the "circled reference alphanumerals" in the drawing.

Solid line "I": the displacement of a piston of the hydraulic actuator of the friction device CL Solid line "II" the command current of the pilot valve 2 (the pilot oil pressure outputted by the pilot valve 2)

Solid line "III": the displacement of the pressure control valving element 12

Solid line "IV": the driving oil pressure (actual oil pressure) supplied from the oil pressure control valve 1 to the friction device CL Solid line "V": the on/off signal of the oil pressure switch SW Shift control start time "A": time when the linear solenoid 32 is turned on Oil supply start time "B": time when the communication between the input port 14 and the output port 15 is started by displacement of the pressure control valving element 12

Filling end time "C": time when the driving oil pressure rises to a position immediately before the piston of the hydraulic actuator starts to press against a frictional engagement portion such as multiple discs Pressure control start time "D": time when, after the filling end time "C", the driving oil pressure starts to be gradually increased to smooth the frictional engagement of the frictional engagement portion Engagement detection time "E": time when the engagement of the friction device CL is detected by operation of the oil pressure switch SW Non-energization interval "1": interval for which the linear solenoid 32 is off Pressure control start interval "2": interval from the shift control start time "A" to the oil supply start time "B"

Filling interval "3": interval from the oil supply start time "B" to the filling end time "C"

Engagement undetected interval "4A": interval until the engagement detection time "E" is detected within the pressure control interval Engagement detected interval "4B": interval after the engagement detection time "E" is detected within the pressure control interval Non-pressure control interval: same as the above non-energization interval "1"

Filling interval: interval from the shift control start time "A" to the filling end time "C"

Pressure control interval: interval for which, after the filling end time "C", the driving oil pressure is gradually increased Filling determination interval: interval during which the filling end time "C" is detected by on/off operation of the oil pressure switch SW and the pressure changeover valve 43 is switched to the filling determination side Fail-safe determination interval: interval during which the engagement state of the friction device CL is determined by on/off operation of the oil pressure switch SW and the pressure changeover valve 43 is switched to the fail-safe determination side.

Hereafter, concrete description will be given to a technology characteristic of the first embodiment.

The pressure control valving element 12 in this embodiment has the auxiliary land 44 between the input switching land 21 and the F/B land 23. When the pressure control valving element 12 is displaced from the stop position (the fully closed position of the oil pressure control valve 1) to the right of the drawing, the state of communication between the input port 14 and the auxiliary port 41 is switched from an uncommunicated state to a communicated state.

In the pressure control shaft hole 11, there is formed a drain port 45 that communicates with the low pressure side between the auxiliary port 41 and the F/B port 17. When the pressure control valving element 12 is displaced from the stop position to the right of the drawing, the state of communication between the auxiliary port 41 and the drain port 45 is switched from a communicated state to an uncommunicated state.

Concrete switching timing is as described below. When the pressure control valving element 12 is displaced from the stop position to the right of the drawing, the following takes place at the oil supply start time "B": the state of communication between the input port 14 and the auxiliary port 41 is switched from a communicated state to an uncommunicated state; and the state of communication between the auxiliary port 41 and the drain port 45 is switched from a communicated state to an uncommunicated state.

When the pressure control valving element 12 is displaced from the right of the drawing to the stop position, the following takes place at the filling end time "C": the state of communication between the input port 14 and the auxiliary port 41 is switched from a communicated state to an uncommunicated state; and the state of communication between the auxiliary port 41 and the drain port 45 is switched from an uncommunicated state to a communicated state.

The oil pressure switch SW is of publicly known structure and is turned on when the oil pressure supplied to the detected pressure input port 42 reaches a predetermined oil pressure (threshold value). The threshold value for switching from off to on is set to an "engagement detection threshold value (X)" equivalent to an engaging oil pressure at which engagement is achieved at the friction device CL.

As mentioned above, the pressure changeover valve 43 changes detected pressure between driving oil pressure outputted from the output port 15 and auxiliary oil pressure outputted from the auxiliary port 41. Then the pressure changeover valve 43 supplies this pressure to the detected pressure input port 42 of the oil pressure switch SW. The pressure changeover valve 43 adopts a simple three-way changeover valve structure constructed of a changeover spool 46 and a return spring 47.

Concrete description will be given to the structure of the pressure changeover valve 43.

The changeover spool 46 is supported in a changeover shaft hole 48 formed in the valve body forming an oil hydraulic circuit so that the changeover spool can be slid in the axial direction.

The return spring 47 is a coil spring, formed in a cylindrical and spiral shape, which biases the changeover spool 46 to the right of the drawing.

In the changeover shaft hole 48, there are formed the following elements in the following order from the left to the right in the drawing: an auxiliary oil pressure inlet port 51 communicating with the auxiliary port 41; a detected pressure supply port 52 communicating with the detected pressure input port 42 of the oil pressure switch SW; a driving oil pressure inlet port 53 communicating with the oil passage running from the output port 15 of the oil pressure control valve 1 to the friction device CL, through which driving oil pressure is guided; and a switching pressure inlet port 54 that supplies switching pressure for driving the changeover spool 46 to the left of the drawing. The pressure of a spring chamber for housing the return spring 47 is exhausted through a drain port, not shown, and the volumetric capacity of the spring chamber is variable.

The changeover spool 46 includes a first seal land 55 for opening/closing the auxiliary oil pressure inlet port 51 and a second seal land 56 for opening/closing the driving oil pressure inlet port 53. A distribution chamber communicating with the detected pressure supply port 52 is formed therebetween. The following is caused to take place by switching and displacement of the changeover spool 46: either of the auxiliary oil pressure inlet port 51 and the driving oil pressure inlet port 53 is closed; and the other of the auxiliary oil pressure inlet port 51 and the driving oil pressure inlet port 53 communicates with the detected pressure supply port 52.

The pressure changeover valve 43 in the first embodiment is switched by auxiliary oil pressure outputted from the auxiliary port 41. That is, the pressure changeover valve is so provided that part of auxiliary oil pressure outputted from the auxiliary port 41 is guided to the switching pressure inlet port 54.

When the auxiliary port 41 communicates with the input port 14, as a result, the following takes place: the changeover spool 46 is displaced to the left side (filling determination side) of the drawing by auxiliary oil pressure (pump oil pressure supplied from the input port 14) supplied to the switching pressure inlet port 54. As a result, the auxiliary oil pressure inlet port 51 and the detected pressure supply port 52 communicate with each other and the communication between the detected pressure supply port 52 and the driving oil pressure inlet port 53 is blocked.

When the communication between the auxiliary port 41 and the input port 14 is blocked, the following takes place: the switching pressure inlet port 54 is brought into a pressure exhaust state and the changeover spool 46 is displaced to the right side (fail-safe determination side) of the drawing by biasing force from the return spring 47. As a result, the detected pressure supply port 52 and the driving oil pressure inlet port 53 communicate with each other and the communication between the auxiliary oil pressure inlet port 51 and the detected pressure supply port 52 is blocked.

Description will be given to an example of the operation of the first embodiment with reference to the time diagram in FIG. 2 and the operation explaining drawings in FIG. 3 to FIG. 7.

(Stop State: Refer to "1" in FIG. 2 and FIG. 3)

When the TCU disengages the friction device CL, the TCU is in such a state that the TCU has turned off the pilot valve 2. At this time, the valve driving oil chamber 3 is brought into a pressure exhaust state, and the pressure control valving element 12 is stopped in the stop position. The output port 15 is brought into a pressure exhaust state, and the friction device CL is kept disengaged.

(Start of Shift Control: Refer to "2" in FIG. 2 and FIG. 4)

When the TCU determines to execute the engagement of the friction device CL and the TCU starts shift control at the shift control start time "A", first, the TCU fully energizes the pilot valve 2 at the shift control start time "A". As a result, pilot oil pressure is quickly supplied from the pilot valve 2 to the valve driving oil chamber 3 and displacement of the pressure control valving element 12 is quickly started.

(Start of Driving Oil Pressure Supply: Refer to "3" in FIG. 2 and FIG. 5)

The pressure control valving element 12 starts to move to the right of the drawing. When the displacement position of the pressure control valving element 12 reaches a position equivalent to the oil supply start time "B", the following takes place: the degree of communication between the input port 14 and the output port 15 starts to be increased and supply of driving oil pressure to the friction device CL is started. At this time, filling of oil pressure in the friction device CL is underway and the driving oil pressure generated at the output port 15 is low. The F/B oil pressure applied to the F/B chamber is also low and force for pushing the pressure control valving element 12 back to the left side (valve closing direction) of the drawing by the F/B oil pressure is small.

When the displacement position of the pressure control valving element 12 reaches a position equivalent to the oil supply start time "B", the input port 14 and the auxiliary port 41 communicate with each other. High auxiliary oil pressure is guided to the switching pressure inlet port 54 of the pressure changeover valve 43 and the changeover spool 46 is displaced to the left side (filling determination side) of the drawing. Thus the high auxiliary oil pressure generated at the auxiliary port 41 is guided to the oil pressure switch SW.

As a result, the oil pressure switch SW is turned on and the oil supply start time "B" can be detected at the TCU.

Figure 6:
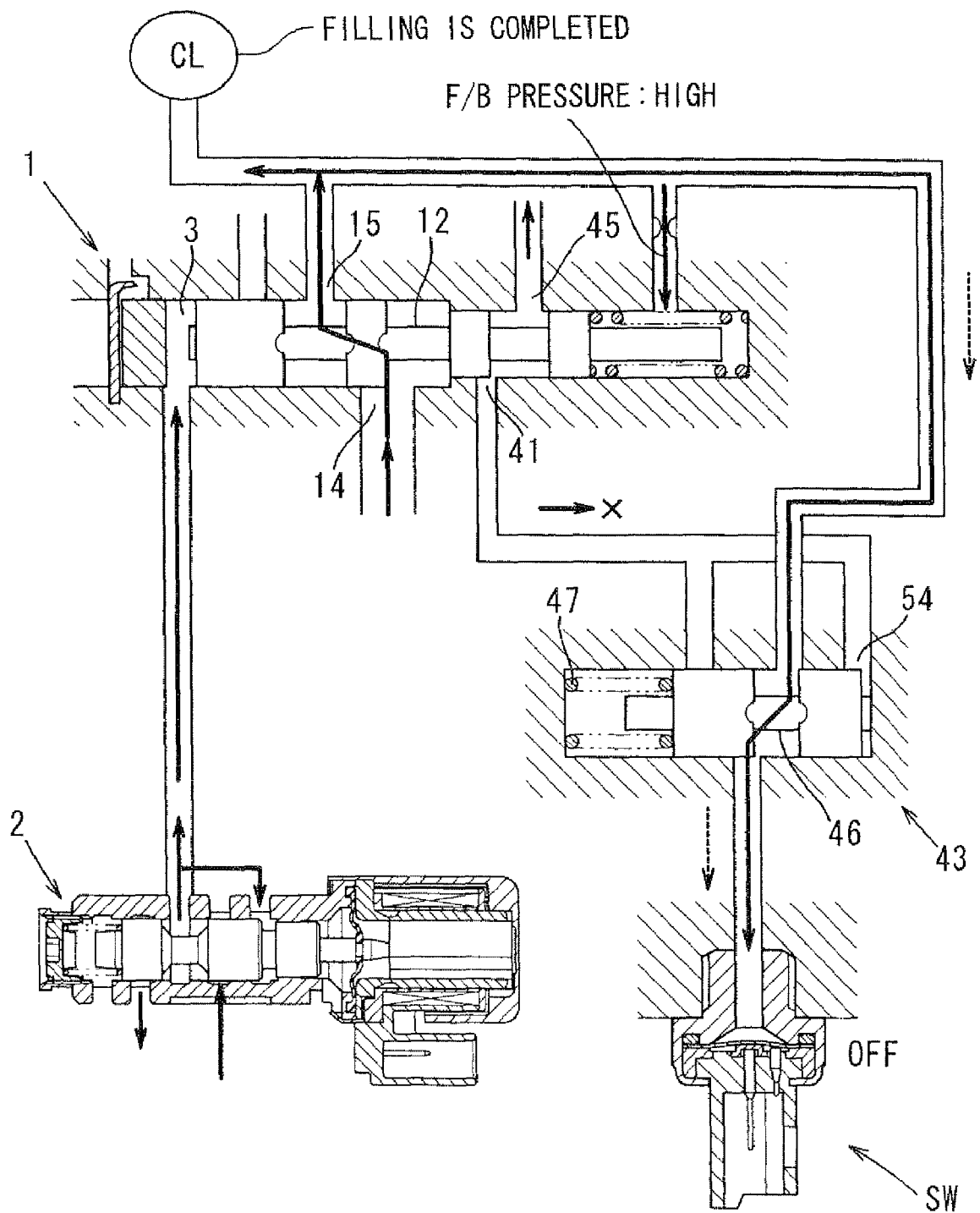
FIG. 6 is a circuit diagram of the hydraulic circuit when filling is completed (first embodiment)
Figure 7:
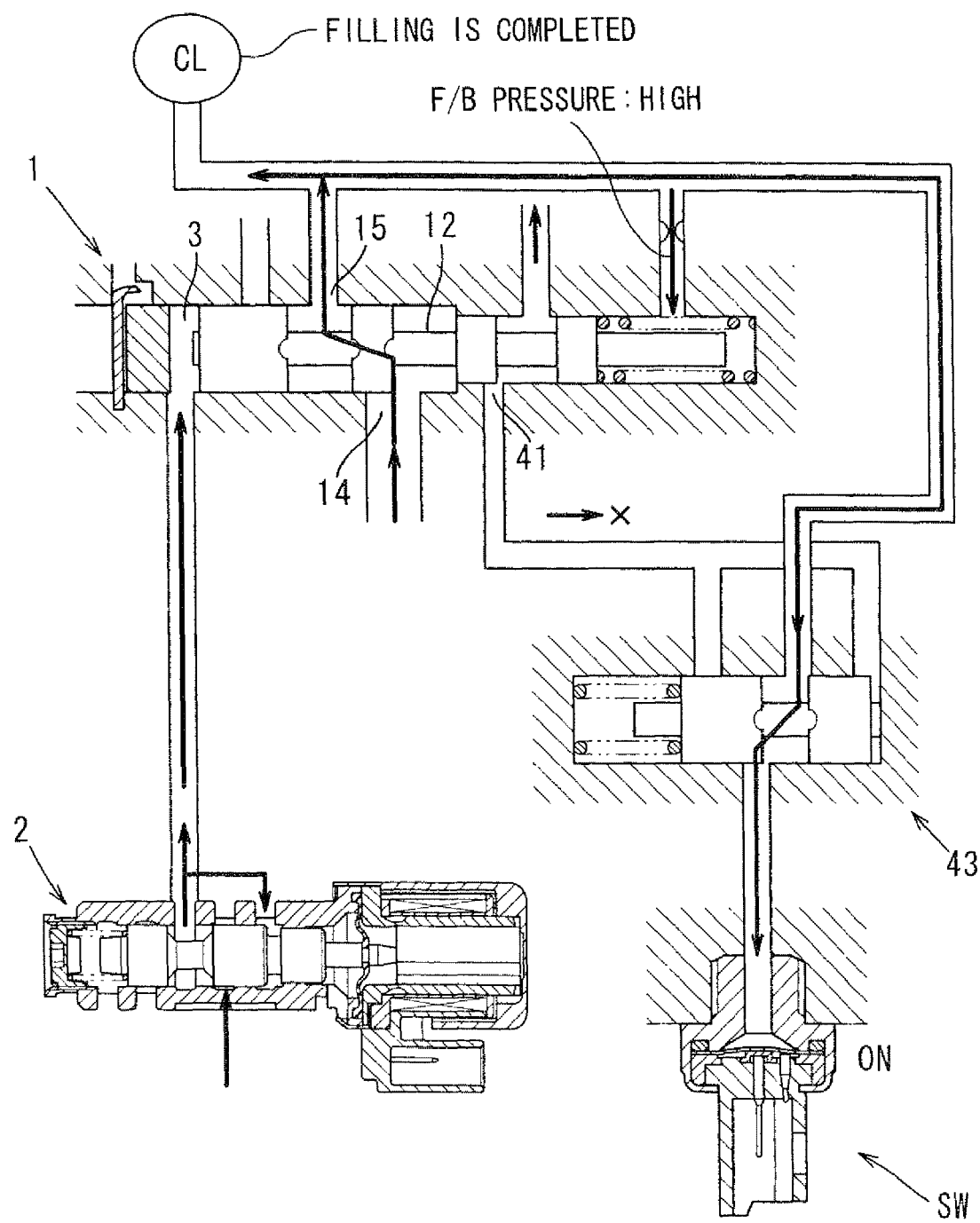
FIG. 7 is a circuit diagram of the hydraulic circuit when engagement is achieved (first embodiment)

(Completion of Filling: Refer to FIG. 6)

When filling of oil pressure in the friction device CL progresses and the driving oil pressure supplied to the friction device CL is increased, the following takes place: the pressure control valving element 12 is pushed back to the left side (valve closing side) of the drawing by increase in F/B oil pressure and the communication between the input port 14 and the auxiliary port 41 is blocked. When the driving oil pressure supplied to the friction device CL is further increased and the driving oil pressure is increased until immediately before engagement of the friction device CL is started, the following takes place: the auxiliary port 41 and the drain port 45 communicate with each other and the pressure of the switching pressure inlet port 54 is exhausted; the changeover spool 46 is displaced to the right side (fail-safe determination side) of the drawing by biasing force from the return spring 47; and the oil pressure supplied to the oil pressure switch SW is switched to the driving oil pressure supplied to the friction device CL.

At this time, the driving oil pressure is at a level immediately before engagement of the friction device CL is started and has not reached a level at which engagement is achieved. For this reason, the oil pressure switch SW is switched from on to off, and the filling end time "C" can be detected at the TCU.

(Immediately Before Engagement: Refer to "4A" in FIG. 2)

When the operation of filling the driving oil pressure in the friction device CL is completed (engagement has not been achieved yet), the TCU carries out the following control to smoothly engage the friction device CL: the TCU reduces the command current for the pilot valve 2 and subsequently gradually increases the command current for the pilot valve 2 to raise pilot oil pressure.

(Achievement of Engagement: Refer to "4B" in FIG. 2 and FIG. 7)

When the filling of oil pressure in the friction device CL further progresses and the driving oil pressure supplied to the friction device CL reaches an engaging oil pressure, the following takes place: the oil pressure switch SW is switched from off to on and the engagement detection time "E" can be detected at the TCU.

Thus, the TCU can prohibit the engagement of friction devices CL that pose a problem when simultaneously engaged and achieve fail-safe.

The above description has been given to the hydraulic control system of one of multiple friction devices CL provided. The above-mentioned characteristic technology is similarly provided also in the hydraulic control systems of at least other friction devices CL where fail-safe is required.

Effect of First Embodiment

As mentioned above, the hydraulic control system of the friction device CL where fail-safe is required is provided with one oil pressure switch SW and one pressure changeover valve 43. The following can be implemented by changing the oil pressure guided to the oil pressure switch SW by the pressure changeover valve 43: "fail-safe determination based on driving oil pressure: example of driving pressure detection"; and "filling determination based on the displacement position of the pressure control valving element 12: specifically, determination of the oil supply start time "B" and the filling end time "C": example of time detection."

To carry out "fail-safe determination" and "filling determination" according to related arts, it is required to use two oil pressure switches SW. In the first embodiment, only one oil pressure switch SW is required and thus it is possible to reduce a cost to carry out "fail-safe determination" and "filling determination."

More specific description will be given. With related arts, it is required to use two oil pressure switches SW. In this embodiment, meanwhile, one oil pressure switch SW and one pressure changeover valve 43 are only needed. The pressure changeover valve 43 is small in number of components and simple in structure; therefore, it can reduce a cost as compared with the oil pressure switch SW. For this reason, even when one oil pressure switch SW and one pressure changeover valve 43 are used together, a cost can be reduced as compared with cases where two oil pressure switches SW are used.

Second Embodiment

Description will be given to a second embodiment with reference to FIG. 8 to FIG. 14. In the following description of this embodiment, the same reference alphanumerals as in the description of the first embodiment denote identical functional elements.

In the second embodiment, a spool driving piston (land) 61, large in diameter, is provided on the left of the pressure control valving element 12 in the drawings to increase driving force for the pressure control valving element 12 relative to pilot oil pressure.

Figure 8:
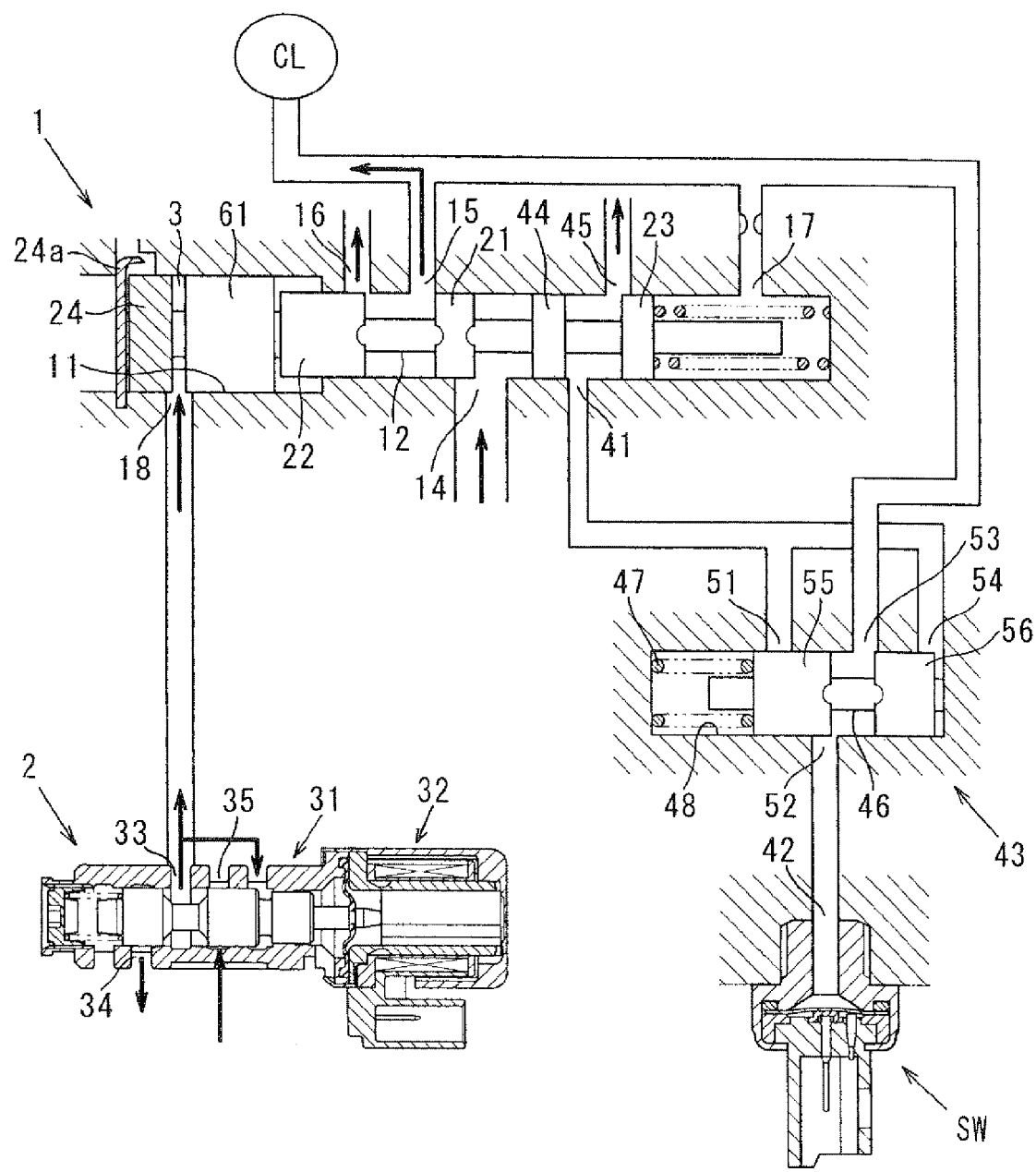
FIG. 8 is a circuit diagram of a hydraulic circuit for controlling the engagement/disengagement of a friction device (second embodiment)
Figure 9:
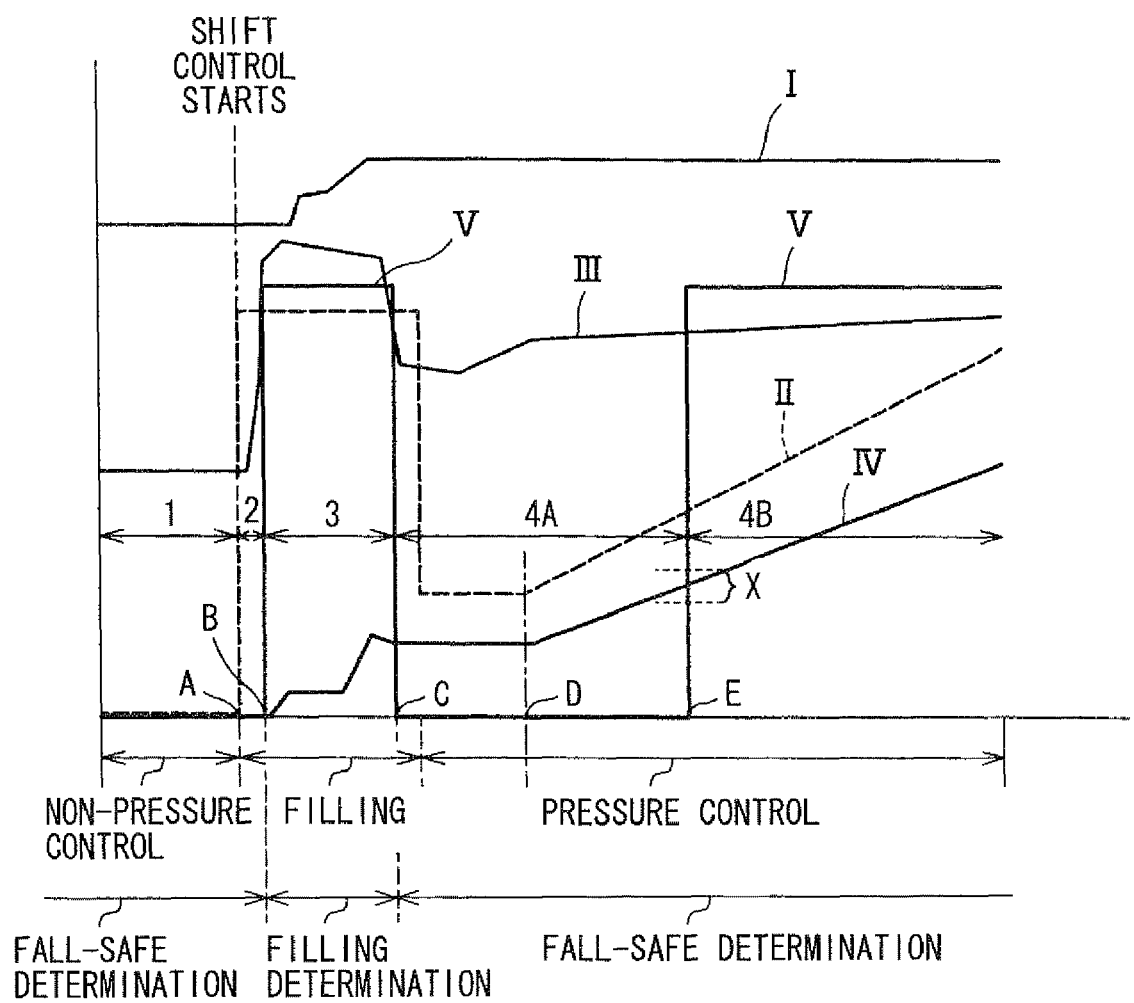
FIG. 9 is a time diagram explaining operation (second embodiment)
Figure 10:
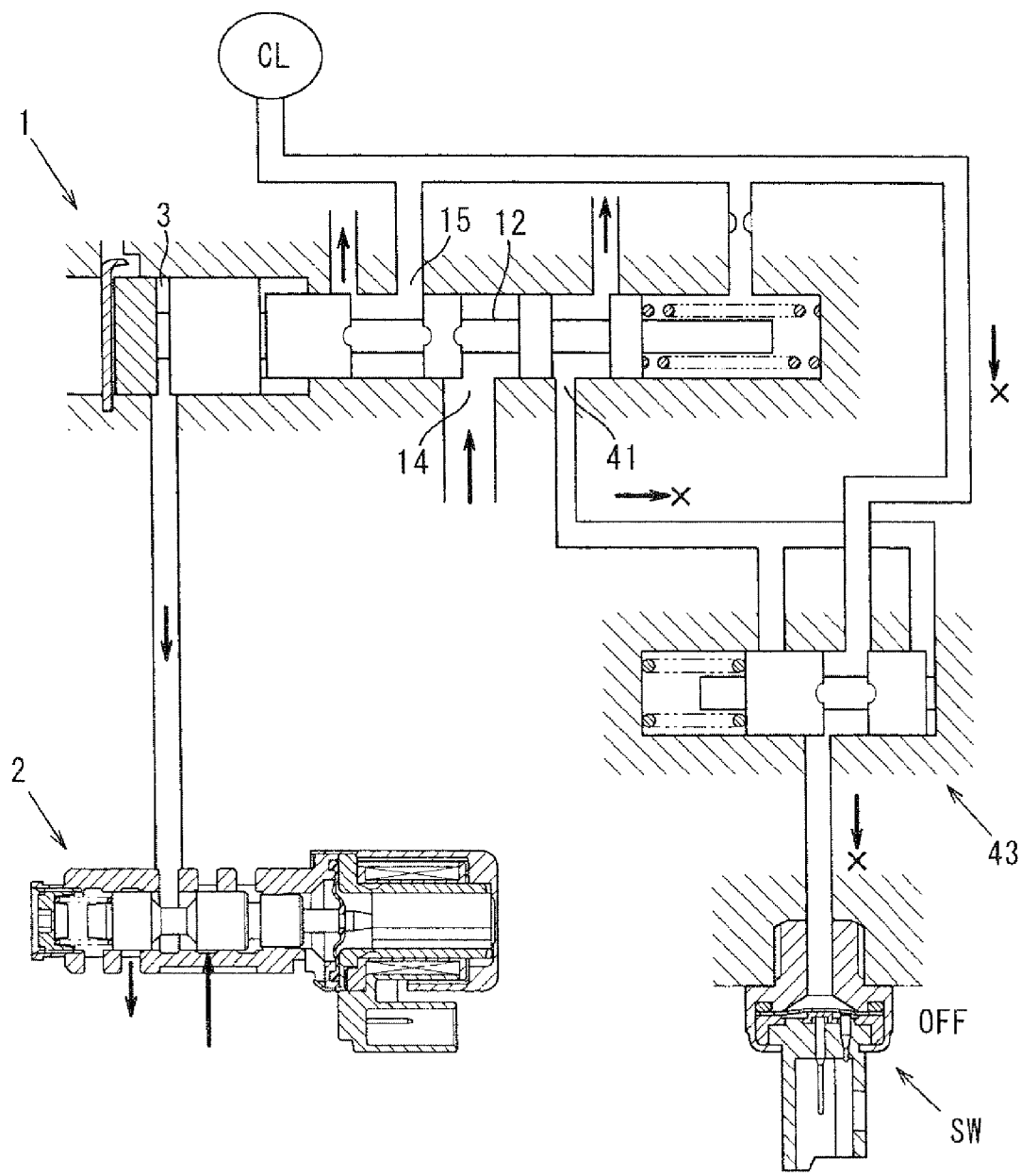
FIG. 10 is a circuit diagram of the hydraulic circuit in a stopped state (second embodiment)
Figure 11:
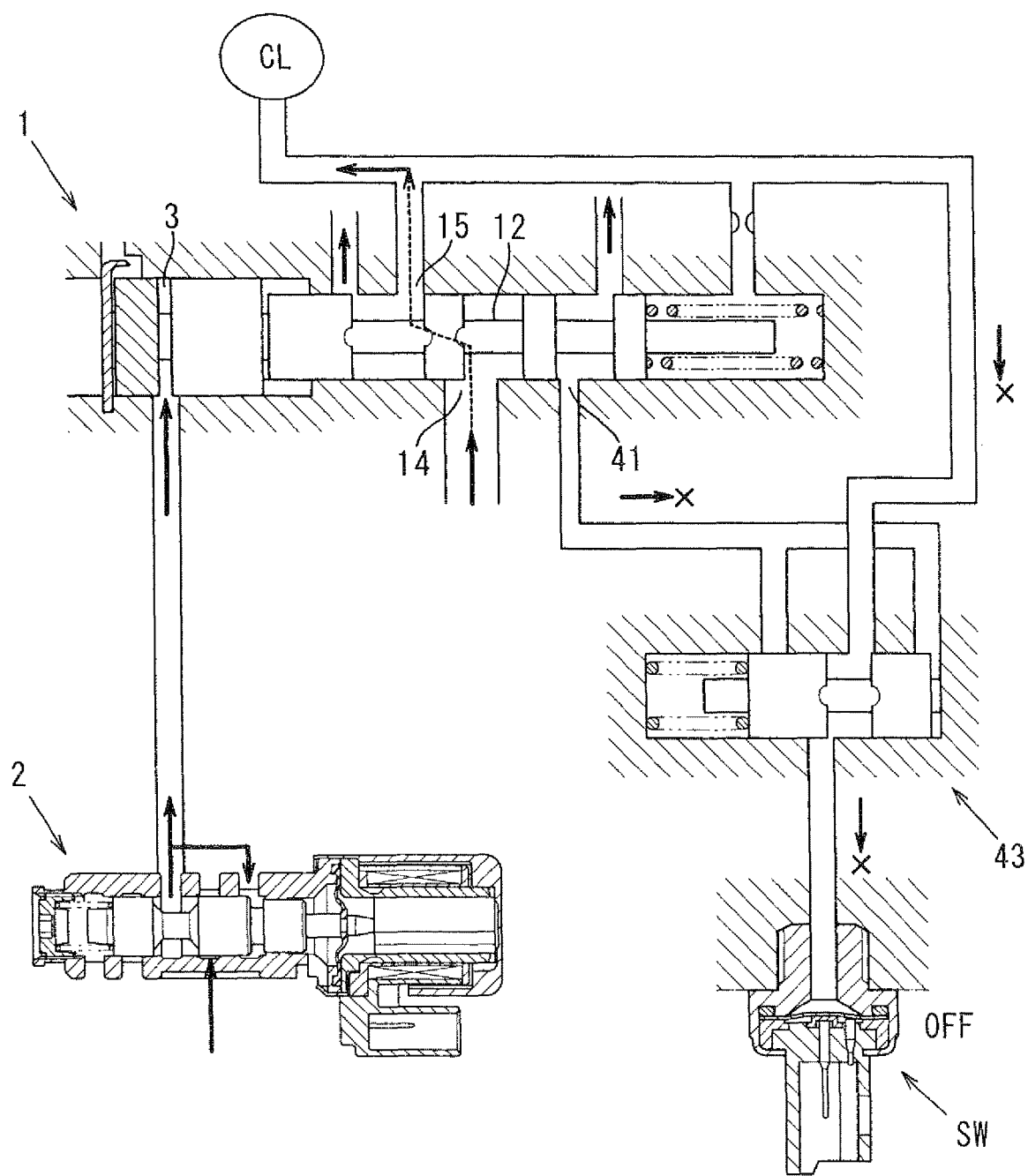
FIG. 11 is a circuit diagram of the hydraulic circuit when shift control is started (second embodiment)
Figure 12:
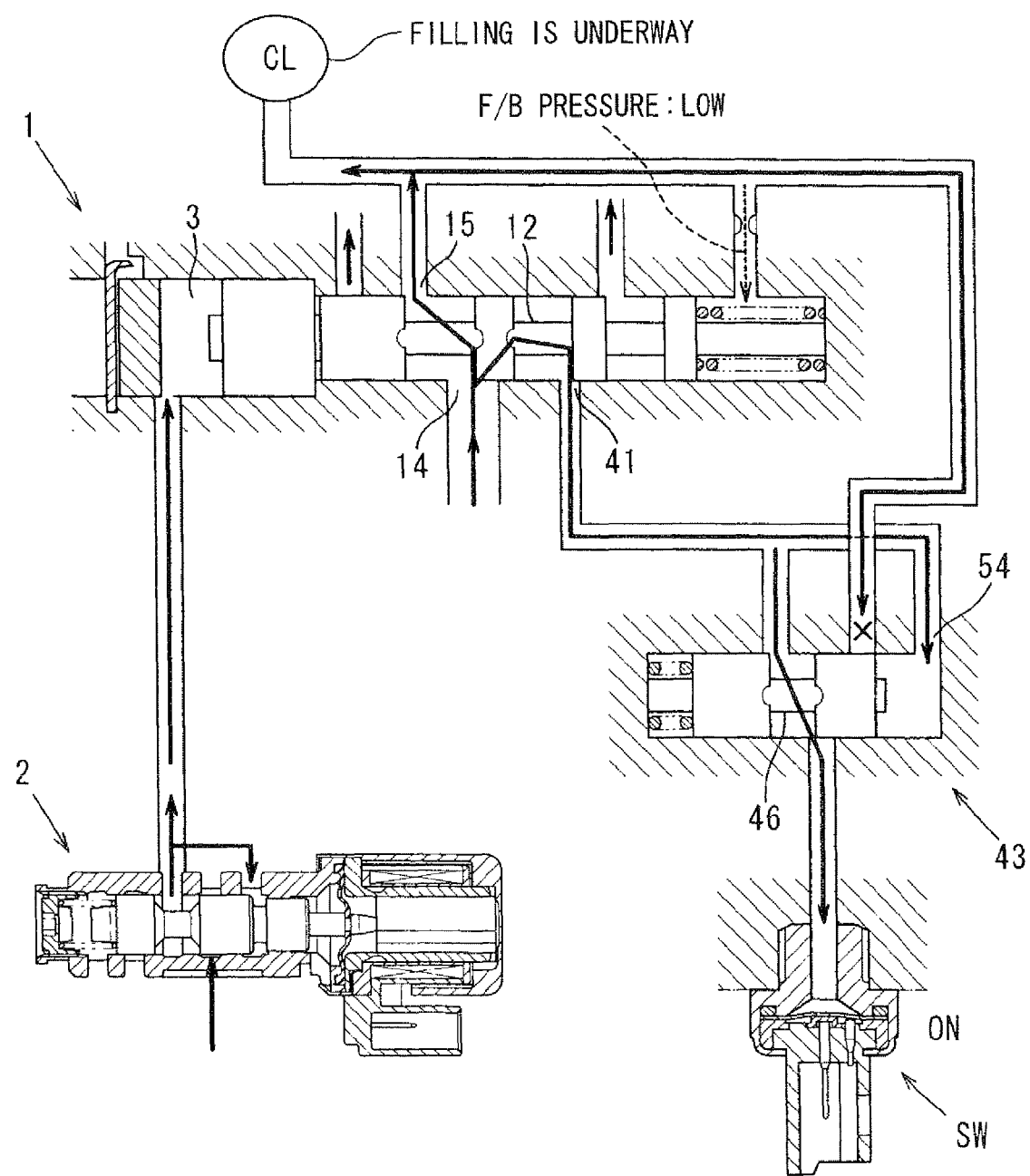
FIG. 12 is a circuit diagram of the hydraulic circuit when supply of driving oil pressure is started (second embodiment)
Figure 13:
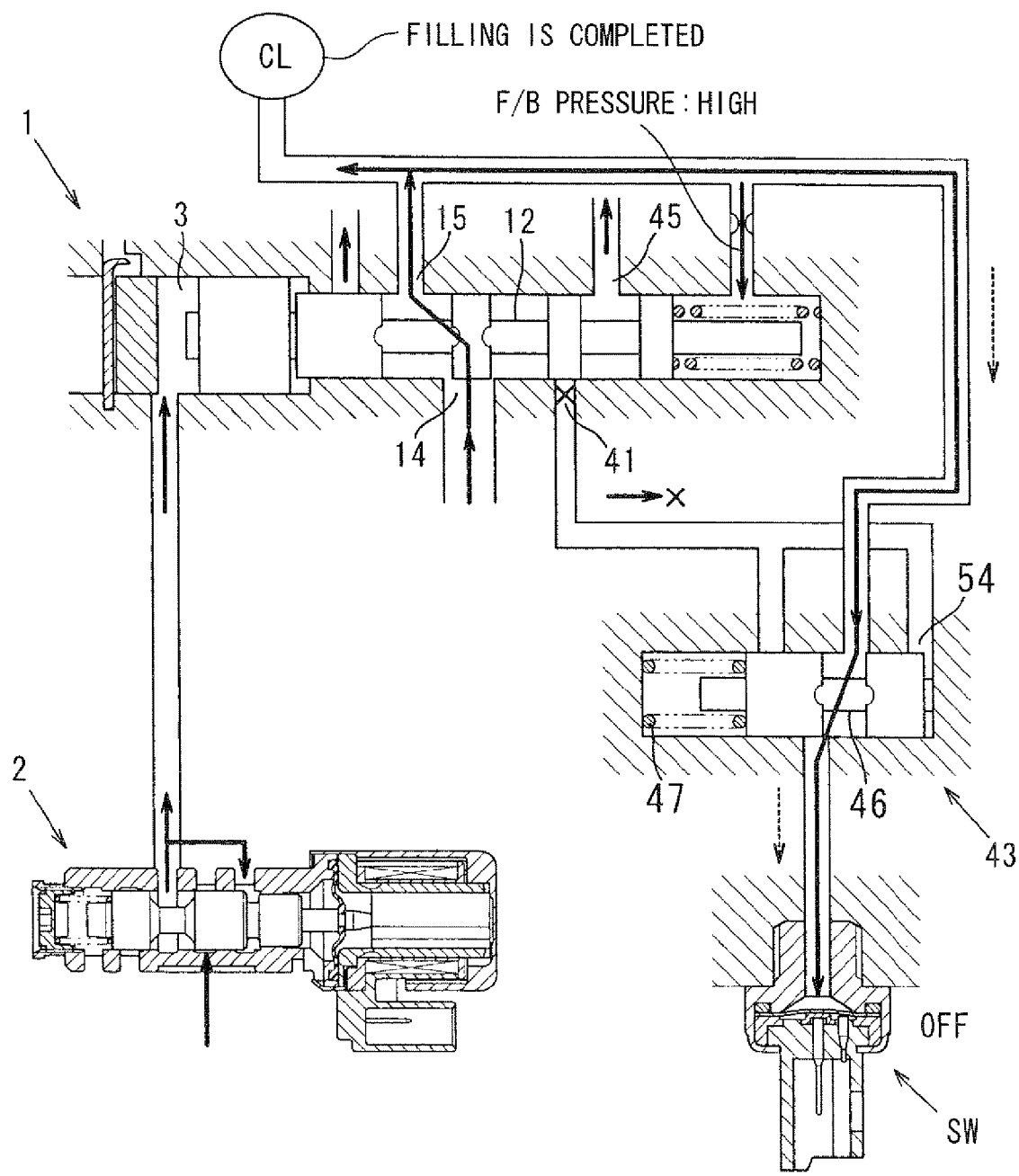
FIG. 13 a circuit diagram of the hydraulic circuit when filling is completed (second embodiment)
Figure 14:
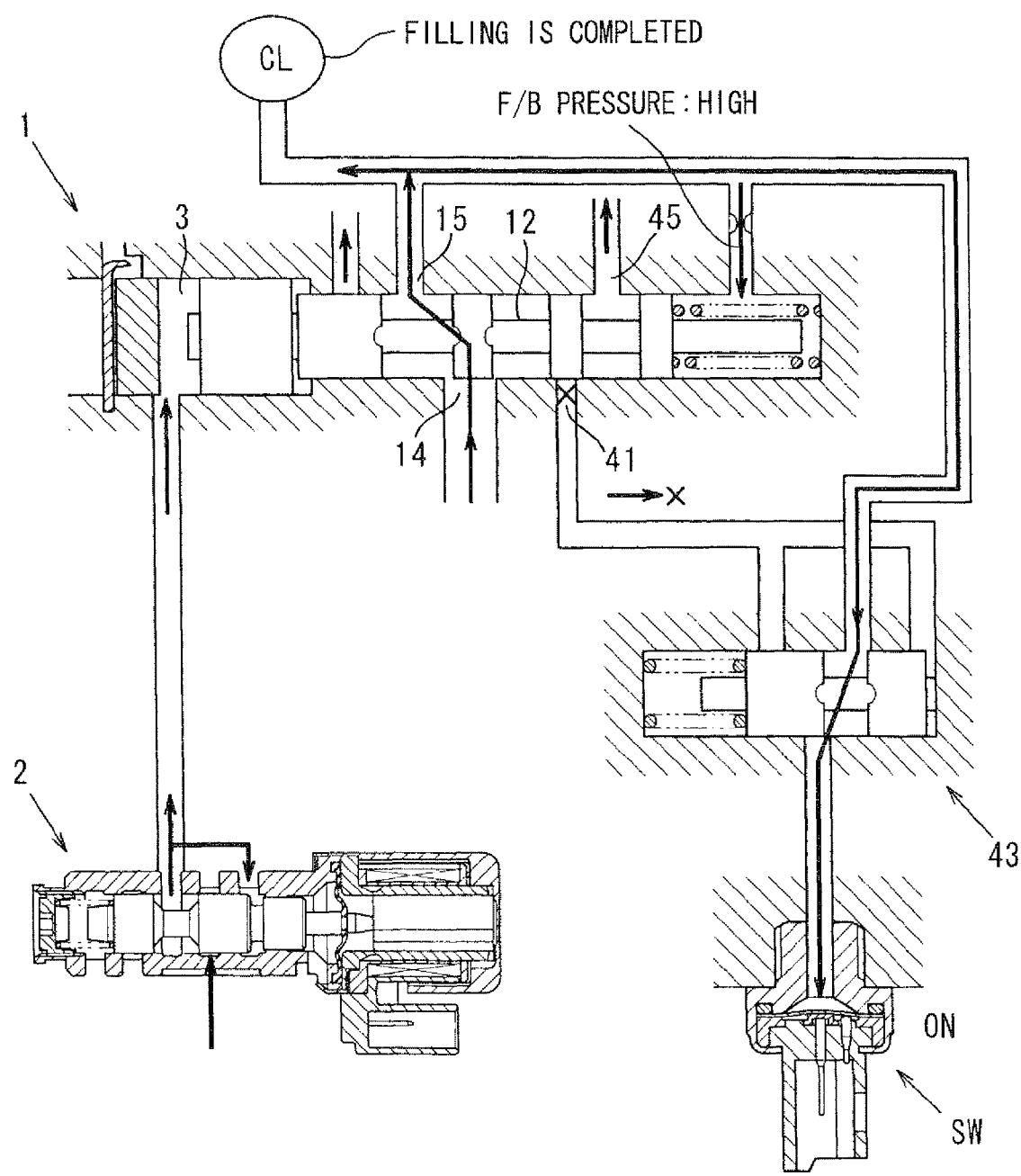
FIG. 14 is a circuit diagram of the hydraulic circuit when engagement is achieved (second embodiment)

The basic operation of the second embodiment is the same as the basic operation of the first embodiment. FIG. 8 to FIG. 14 corresponding to FIG. 1 to FIG. 7 in relation to the first embodiment will be presented and the description of the second embodiment will be omitted. FIG. 8 corresponds to FIG. 1 in relation to the first embodiment; FIG. 9 corresponds to FIG. 2 in relation to the first embodiment; FIG. 10 corresponds to FIG. 3 in relation to the first embodiment; FIG. 11 corresponds to FIG. 4 in relation to the first embodiment; FIG. 12 corresponds to FIG. 5 in relation to the first embodiment; FIG. 13 corresponds to FIG. 6 in relation to the first embodiment; and FIG. 14 corresponds to FIG. 7 in relation to the first embodiment.

Third Embodiment

Description will be given to a third embodiment with reference to FIG. 15 to FIG. 21.

In the description of the first and second embodiments, cases where the pressure changeover valve 43 is switched by auxiliary oil pressure outputted from the auxiliary port 41 are taken as examples.

Figure 15:
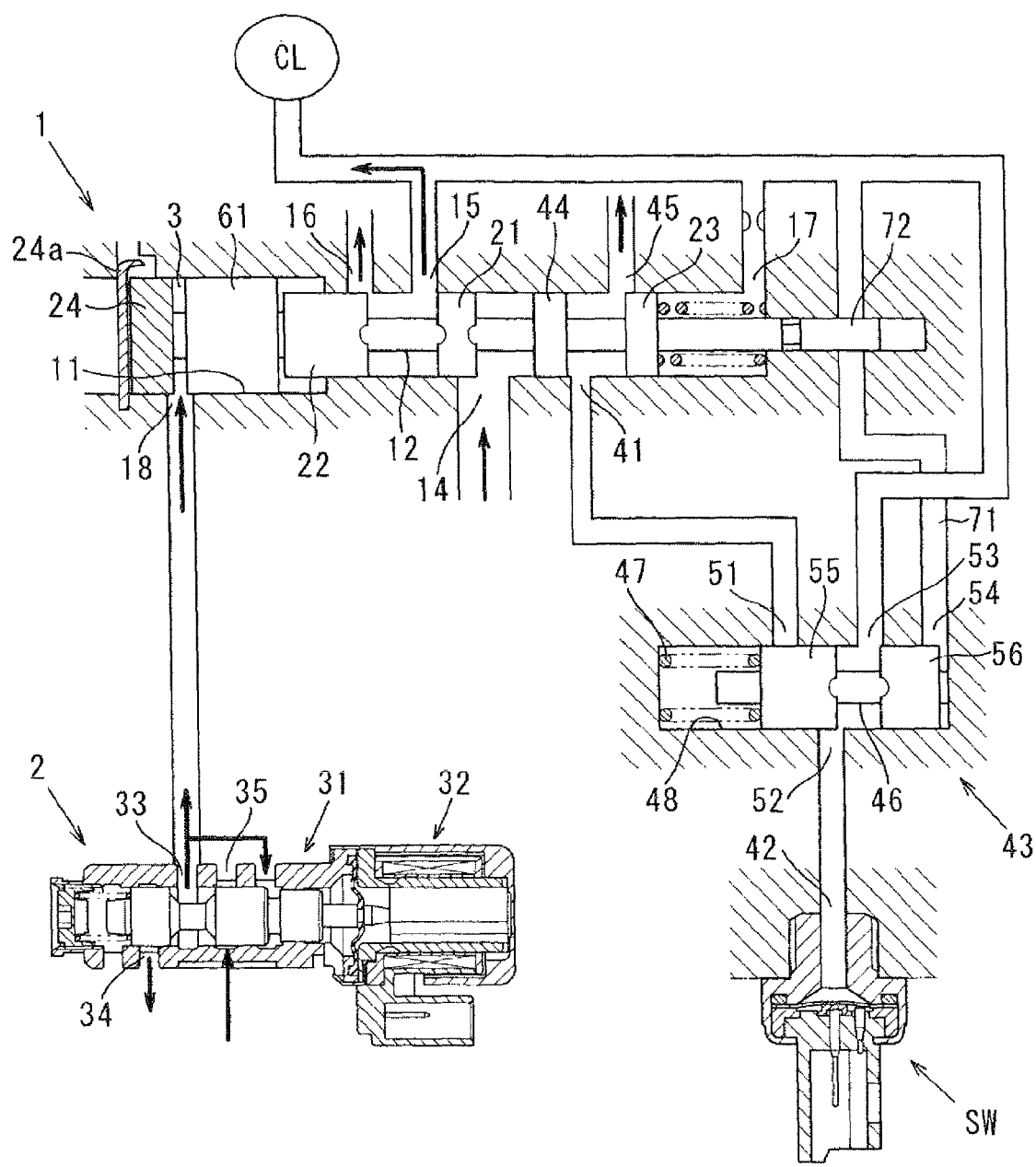
FIG. 15 is a circuit diagram of a hydraulic circuit for controlling the engagement/disengagement of a friction device (third embodiment)

In the description of the third embodiment, meanwhile, a case where the pressure changeover valve 43 is switched by driving oil pressure outputted from the output port 15 as illustrated in FIG. 15 will be taken as an example.

More specific description will be given. The hydraulic control system in the third embodiment is provided with the following oil passage aside from the oil passage for guiding driving oil pressure, supplied to the friction device CL, to the driving oil pressure inlet port 53: a communicating oil passage 71 for guiding driving oil pressure to the switching pressure inlet port 54. The communicating oil passage 71 is so provided that the communicating oil passage is opened or closed according to the displacement position of the pressure control valving element 12. When the communicating oil passage 71 is opened and raised driving oil pressure is guided to the switching pressure inlet port 54, the following takes place: the changeover spool 46 of the pressure changeover valve 43 is switched to the left side (filling determination side) of the drawing.

Furthermore specific description will be given. The pressure control valving element 12 in the third embodiment is integrally provided on the right side of the drawing with an opening/closing land 72, small in diameter, for opening/closing the so communicating oil passage 71. When the pressure control valving element 12 is displaced from the stop position (fully closed position of the oil pressure control valve 1) to the right of the drawing, the communicating oil passage 71 is caused to transition from a closed state to a communicated state.

More detailed description will be given. The opening/closing land 72 opens the communicating oil passage 71 to guide driving oil pressure to the switching pressure inlet port 54 only when the pressure control valving element 12 is between the following positions: a "position where the pressure control valving element 12, departing from the stop position, is immediately before the valving element reaches a position equivalent to the oil supply start time "B""; and "a position where the valving element is immediately after the valving element is pushed back to a position equivalent to the oil supply start time "B" (same as the filling end time "C"). The opening/closing land thereby switches the pressure changeover valve 43 to the filling determination side.

That is, the opening/closing land 72 performs the following operation according to the displacement of the pressure control valving element 12: until the valving element, departing from the stop position, reaches a position immediately before a position equivalent to the oil supply start time "B", the opening/closing land closes the communicating oil passage 71 at some midpoint; and when the pressure control valving element 12 is further displaced from a position immediately before a position equivalent to the oil supply start time "B" to the right side of the drawing, the opening/closing land removes the closure of the communicating oil passage 71 at some midpoint.

When the driving oil pressure further rises and the pressure control valving element 12 is pushed back to the left side (valve closing side) of the drawing, the following takes place: a state in which the pressure control valving element 12 is in a position equivalent to the filling end time "C" (same as the oil supply start time "B") is equivalent to a state in which the closure of the communicating oil passage 71 has been removed; and the pressure changeover valve 43 is kept switched to the filling determination side. When the pressure control valving element 12 is slightly pushed back from a position equivalent to the filling end time "C" to the left side (valve closing side) of the drawing, the communicating oil passage 71 is closed at some midpoint.

Figure 16:
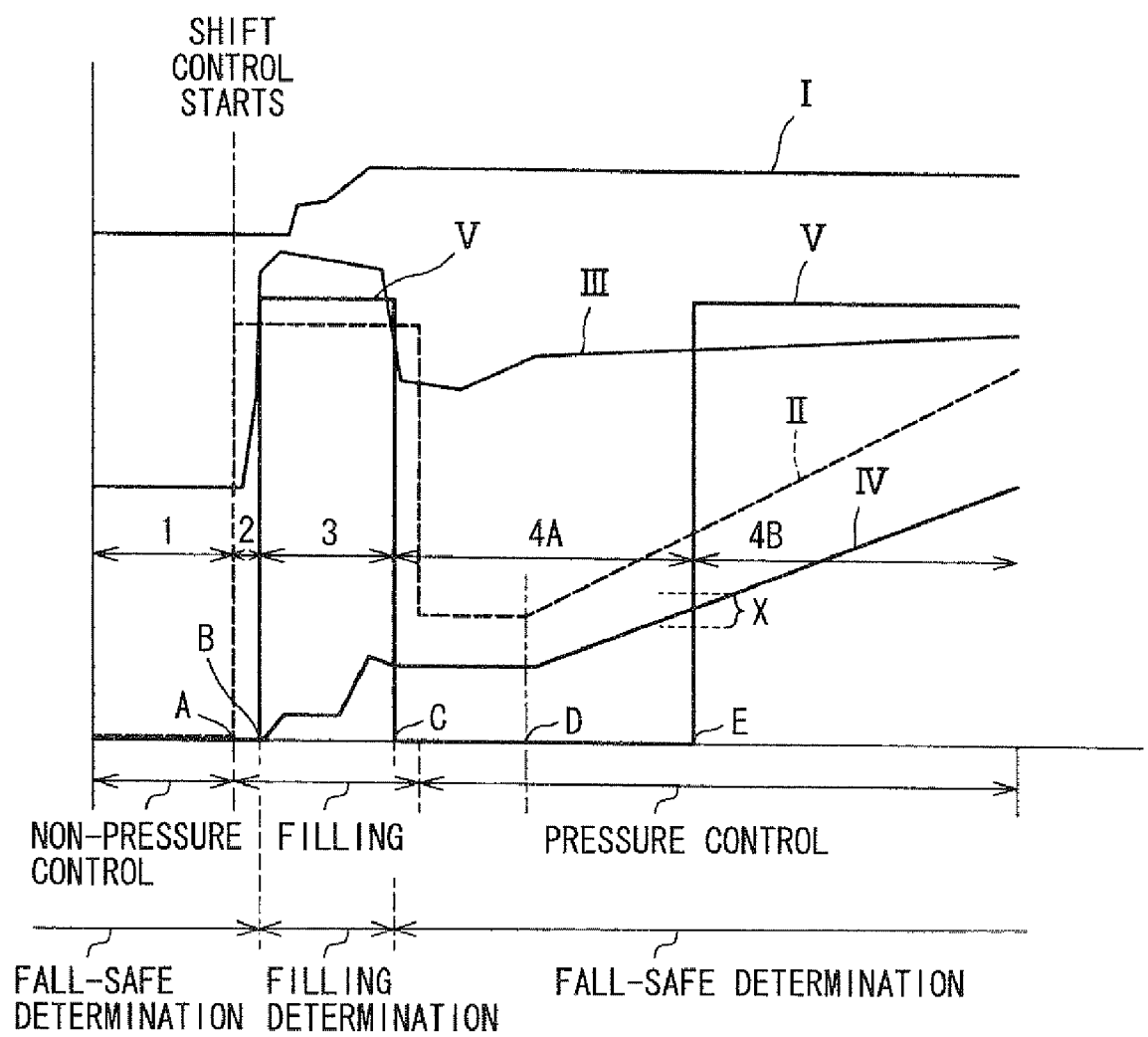
FIG. 16 is a time diagram explaining operation (third embodiment)
Figure 17:
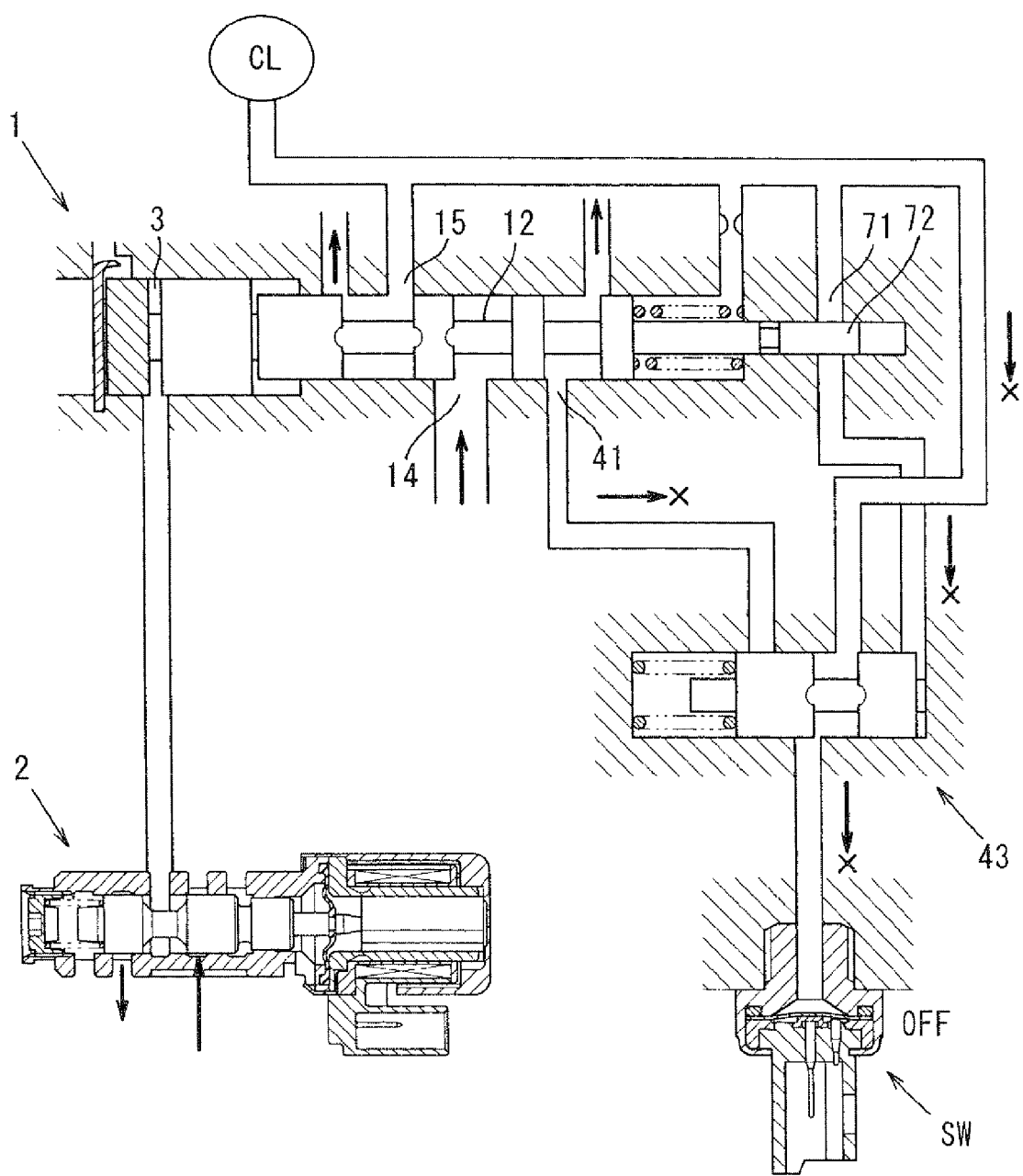
FIG. 17 is a circuit diagram of the hydraulic circuit in a stopped state (third embodiment)
Figure 18:
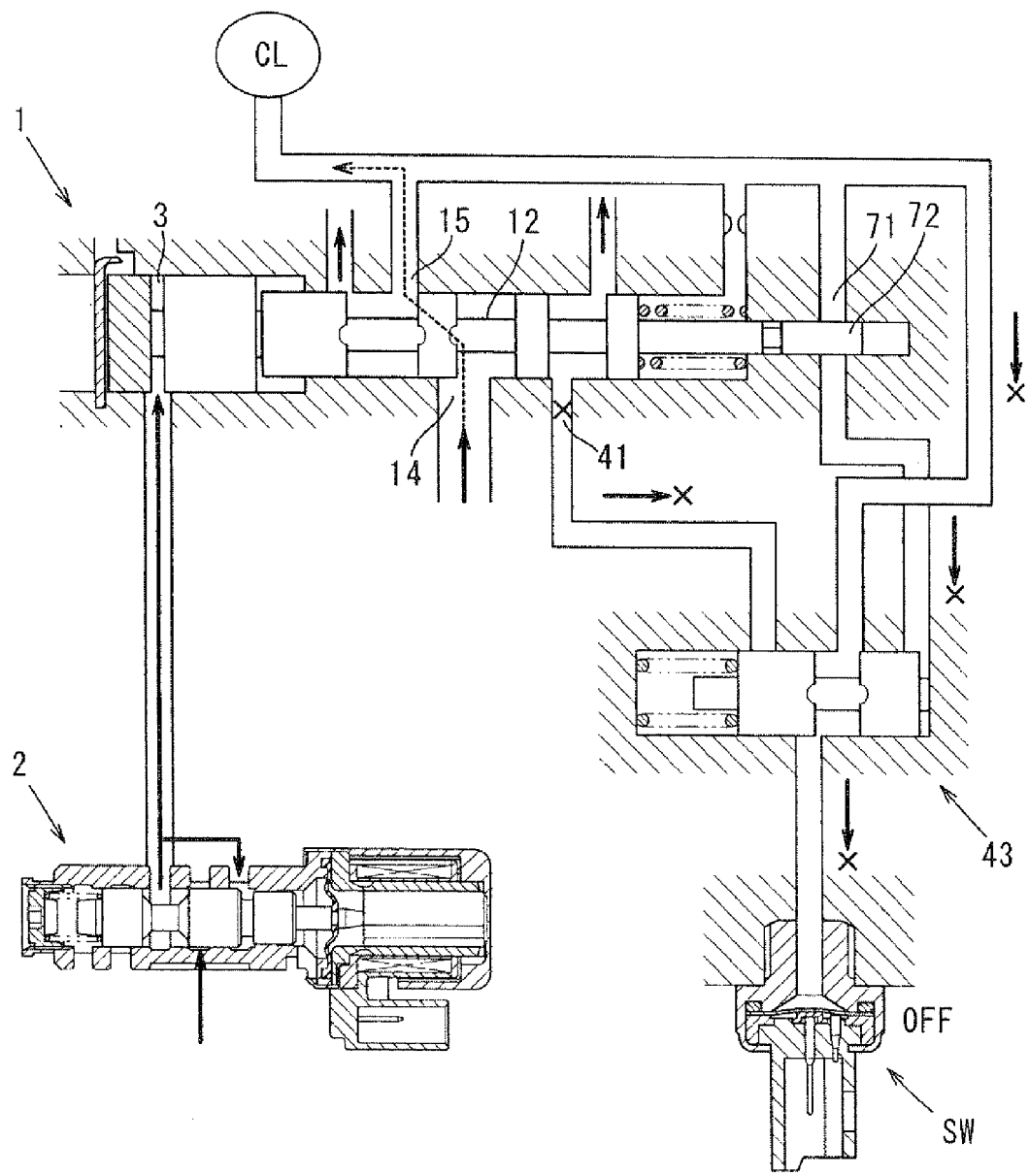
FIG. 18 is a circuit diagram of the hydraulic circuit when shift control is started (third embodiment)
Figure 19:
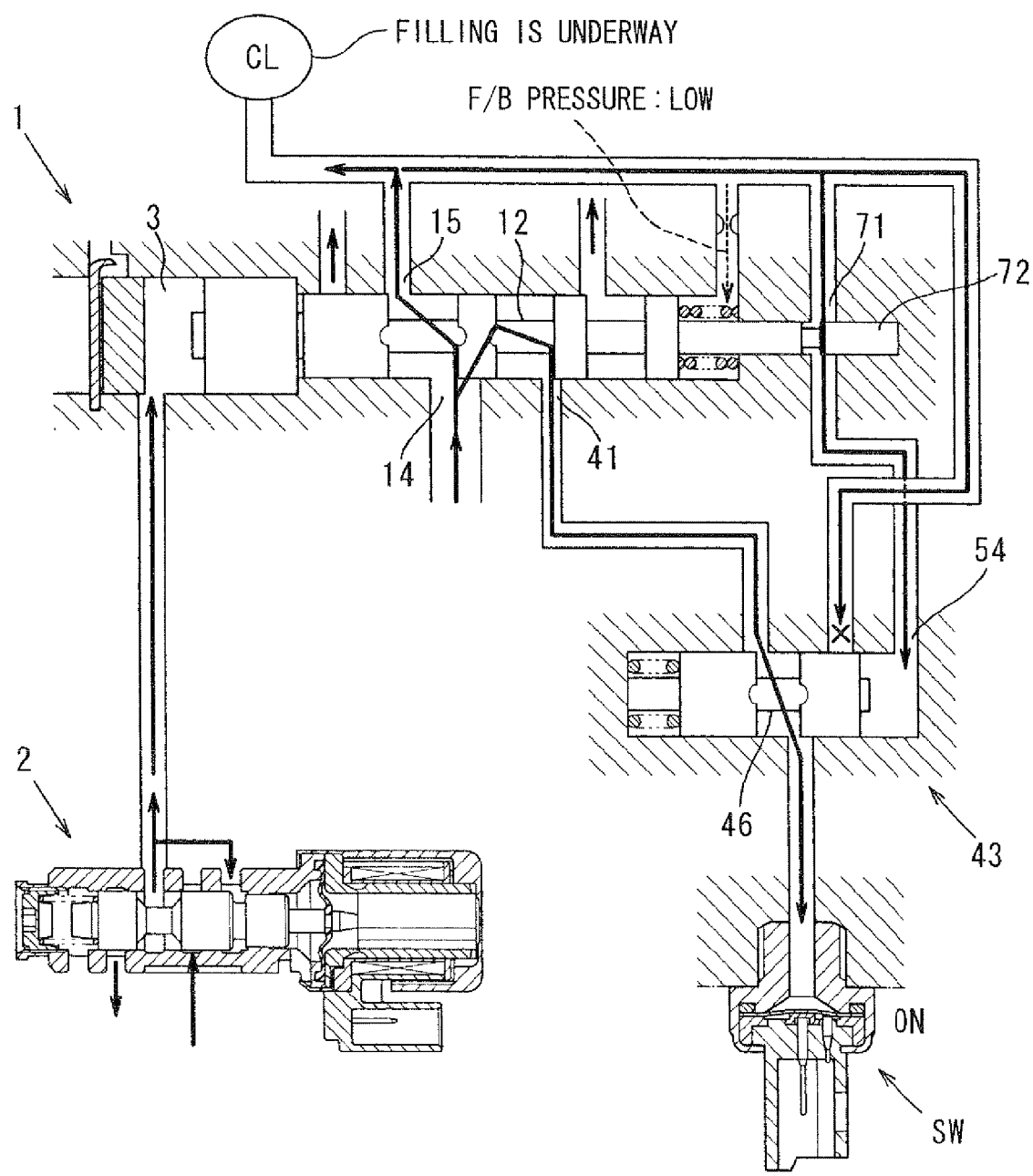
FIG. 19 is a circuit diagram of the hydraulic circuit when supply of driving oil pressure is started (third embodiment)

Description will be given to an example of the operation of the third embodiment with reference to the time diagram in FIG. 16 and the operation explaining drawings in FIG. 17 to FIG. 21.

(Stop State: Refer to "1" in FIG. 16 and FIG. 17)

When the TCU disengages the friction device CL, the TCU is in such a state that the TCU has turned off the pilot valve 2. At this time, the valve driving oil chamber 3 is brought into a pressure exhaust state, and the pressure control valving element 12 is stopped in the stop position. The output port 15 is brought into a pressure exhaust state, and the friction device CL is kept disengaged.

(Start of Shift Control: Refer to "2" in FIG. 16 and FIG. 18)

When the TCU determines to execute the engagement of the friction device CL and the TCU starts shift control at the shift control start time "A", first, the TCU fully energizes the pilot valve 2 at the shift control start time "A". As a result, pilot oil pressure is quickly supplied from the pilot valve 2 to the valve driving oil chamber 3 and displacement of the pressure control valving element 12 is quickly started.

(Start of Driving Oil Pressure Supply: Refer to "3" in FIG. 16 and FIG. 19)

The pressure control valving element 12 starts to move to the right of the drawing. When the degree of communication between the input port 14 and the output port 15 starts to be enhanced, the supply of driving oil pressure to the friction device CL is started. When the displacement position of the pressure control valving element 12 reaches a position immediately before a position equivalent to the oil supply start time "B", the following takes place: the opening/closing land 72 removes the closure of the communicating oil passage 71 at some midpoint to guide driving oil pressure to the switching pressure inlet port 54 and switch the pressure changeover valve 43 to the filling determination side.

When the pressure control valving element 12 is further moved to the right of the drawing and the displacement position of the pressure control valving element 12 reaches a position equivalent to the oil supply start time "B", the following takes place: the input port 14 and the auxiliary port 41 communicate with each other. At this time, the pressure changeover valve 43 has been switched to the filling determination side. Therefore, when a position equivalent to the oil supply start time "B" is reached, high auxiliary oil pressure generated at the auxiliary port 41 is guided to the oil pressure switch SW.

As a result, the oil pressure switch SW is turned on and the oil supply start time "B" can be detected at the TCU.

Figure 20:
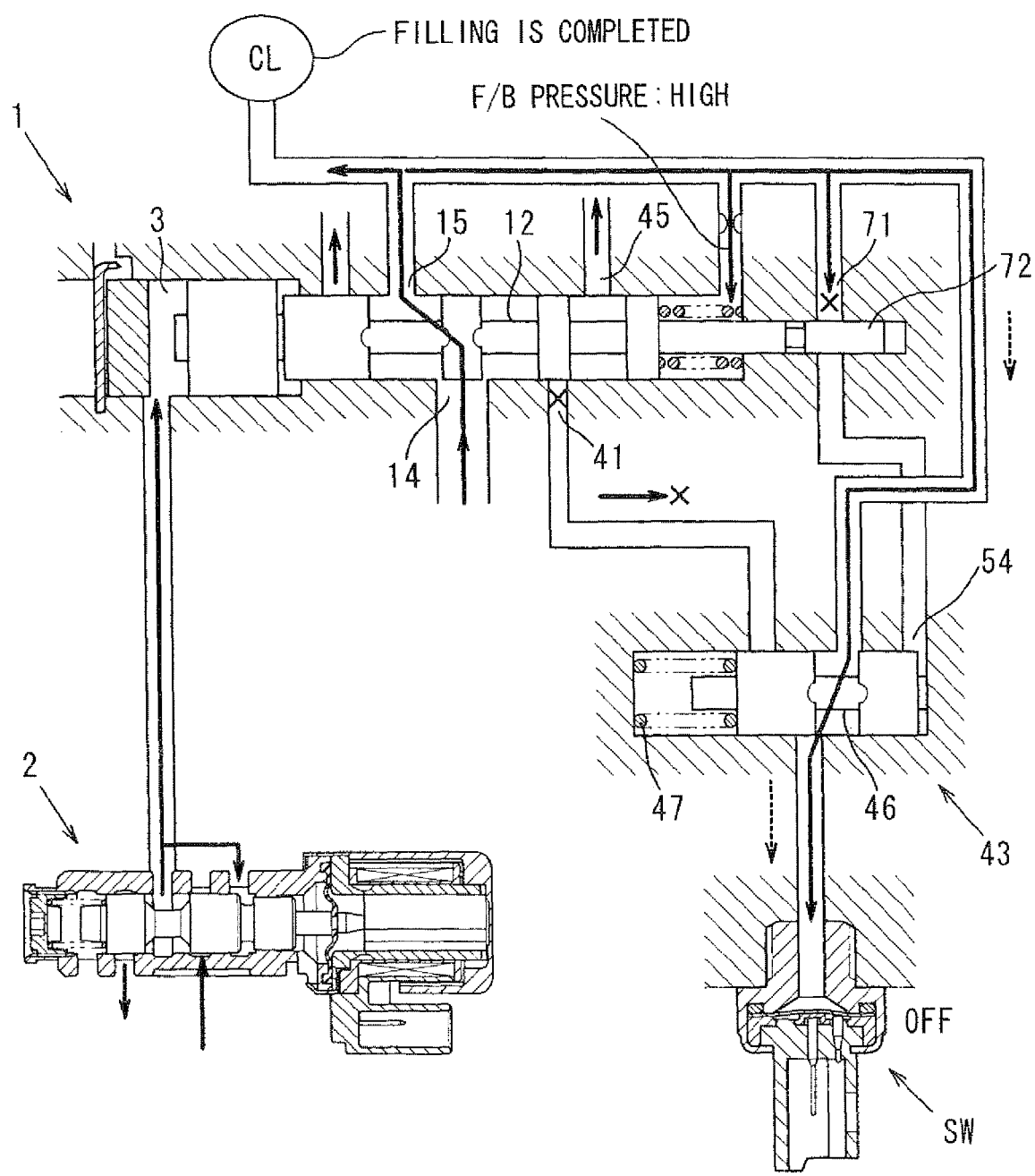
FIG. 20 a circuit diagram of the hydraulic circuit when filling is completed (third embodiment)
Figure 21:
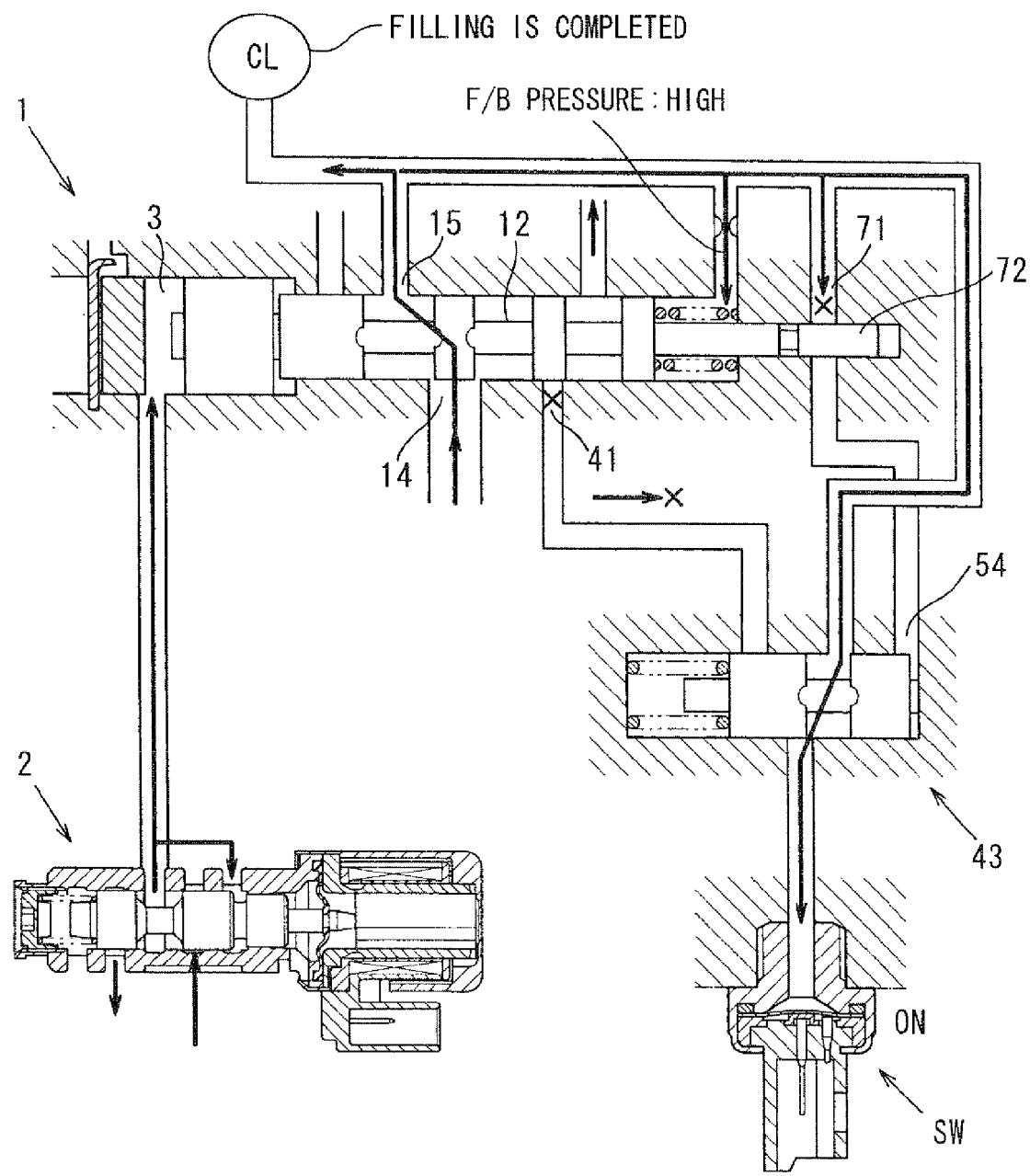
FIG. 21 is a circuit diagram of the hydraulic circuit when engagement is achieved (third embodiment)

(Completion of Filling: Refer to FIG. 20)

When filling of oil pressure in the friction device CL progresses and the driving oil pressure supplied to the friction device CL is increased, the following takes place: the pressure control valving element 12 is pushed back to the left side (valve closing side) of the drawing by increase in F/B oil pressure and the communication between the input port 14 and the auxiliary port 41 is blocked. When the driving oil pressure supplied to the friction device CL is further increased and the driving oil pressure is increased until immediately before engagement of the friction device CL is started, the following takes place: the auxiliary port 41 and the drain port 45 communicate with each other and the pressure of the switching pressure inlet port 54 is exhausted, the changeover spool 46 is displaced to the right side (fail-safe determination side) of the drawing by biasing force from the return spring 47; and the oil pressure supplied to the oil pressure switch SW is switched to the driving oil pressure supplied to the friction device CL.

At this time, the driving oil pressure is at a level immediately before engagement of the friction device CL is started and has not reached a level at which engagement is achieved. For this reason, the oil pressure switch SW is switched from on to off, and the filling end time "C" can be detected at the TCU.

(Immediately Before Engagement: Refer to "4a" in FIG. 16)

When the operation of filling the driving oil pressure in the friction device CL is completed (engagement has not been achieved yet), the TCU carries out the following control to smoothly engage the friction device CL: the TCU reduces the command current for the pilot valve 2 and subsequently gradually increases the command current for the pilot valve 2 to raise pilot oil pressure.

(Achievement of Engagement: Refer to "4b" in FIG. 16 and FIG. 21)

When the filling of oil pressure in the friction device CL further progresses and the driving oil pressure supplied to the friction device CL reaches an engaging oil pressure, the following takes place: the oil pressure switch SW is switched from off to on and the engagement detection time "E" can be detected at the TCU.

Thus, the TCU can prohibit the engagement of friction devices CL that pose a problem when simultaneously engaged and achieve fail-safe.

Fourth Embodiment

Description will be given to a fourth embodiment with reference to FIG. 22 to FIG. 29.

In the description of the first to third embodiments, cases where the pressure changeover valve 43 is switched by oil pressure generated in correspondence with the displacement position of the pressure control valving element 12 are taken as examples.

Figure 22:
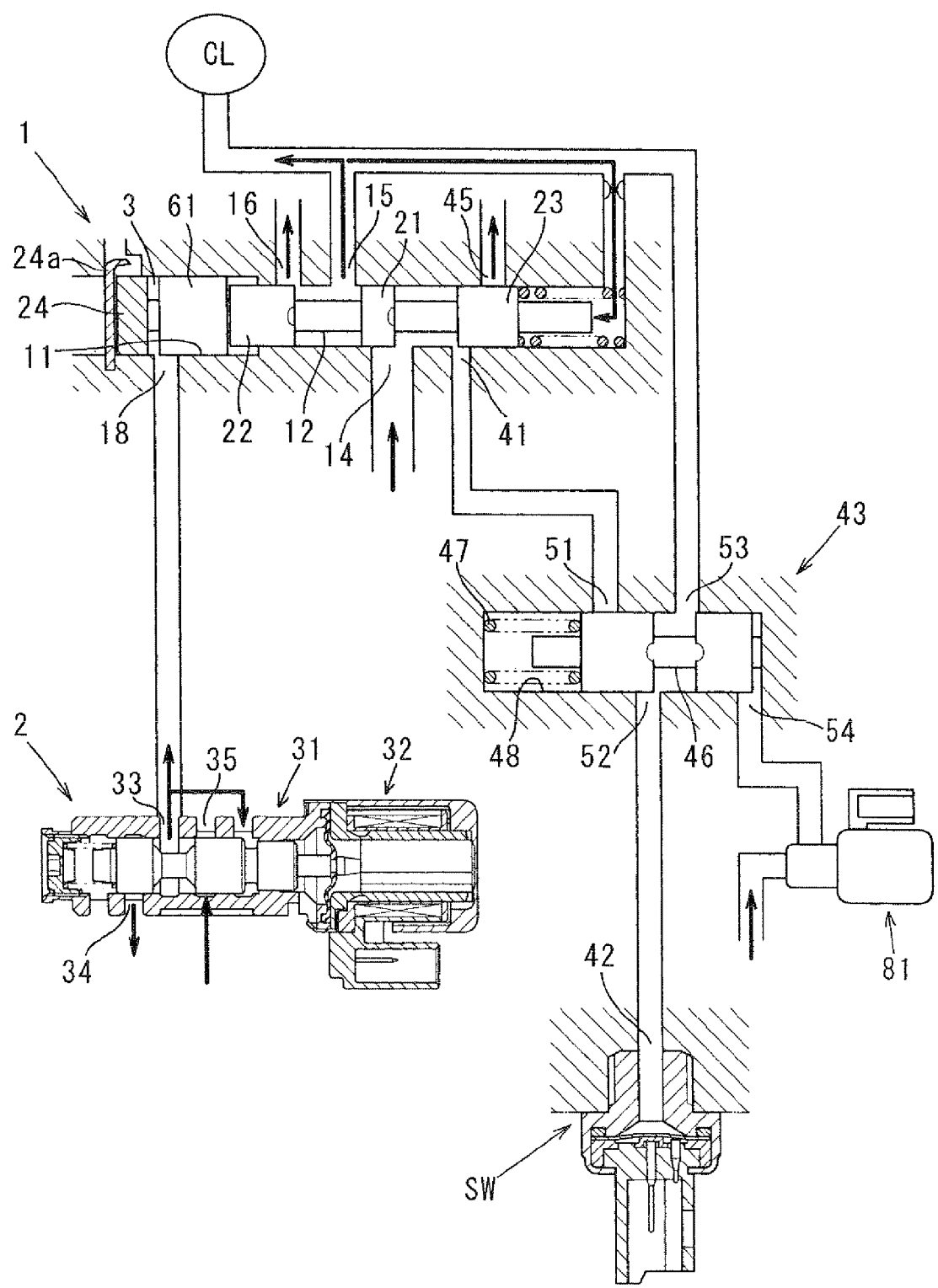
FIG. 22 is a circuit diagram of a hydraulic circuit for controlling the engagement/disengagement of a friction device (fourth embodiment)

In the fourth embodiment, meanwhile, the pressure changeover valve 43 is switched using a dedicated actuator to switching of the pressure changeover valve 43 as illustrated in FIG. 22.

More specific description will be given. The hydraulic control system in the fourth embodiment is provided with an electromagnetic hydraulic changeover valve 81 for switching the supplied oil pressure at the switching pressure inlet port 54 to high or low to independently switch the pressure changeover valve 43.

The electromagnetic hydraulic changeover valve 81 is basically the same as the pilot valve 2 and turn-on/off thereof is controlled by the TCU. Specifically, the electromagnetic hydraulic changeover valve 81 is of N/L type. When turned on, the changeover valve 81 supplies high oil pressure to the switching pressure inlet port 54 to switch the pressure changeover valve 43 to the filling determination side. When turned off, the changeover valve 81 supplies low oil pressure to the switching pressure inlet port 54 to switch the pressure changeover valve 43 to the fail-safe determination side.

A valve of N/H (Normally High) type may be used for the electromagnetic hydraulic changeover valve 81. Such a type that the changeover spool 46 of the pressure changeover valve 43 is directly driven by an electromagnetic actuator may be used.

Description will be given to the control of the electromagnetic hydraulic changeover valve 81 by the TCU. The TCU is provided so that the following operation is performed: the TCU turns on the electromagnetic hydraulic changeover valve 81 immediately before the shift control start time "A"; and when the second turn-on of the oil pressure switch SW is thereafter detected, the TCU turns off the electromagnetic hydraulic changeover valve 81 in preparation for fail-safe. (The oil pressure switch is turned on first immediately after the electromagnetic hydraulic changeover valve 81 is turned on and turned on for the second time when the filling end time "C" is detected.)

The fourth embodiment is not provided with the auxiliary land 44 in the first to third embodiments. Change in the state of communication between the input port 14 and the auxiliary port 41 and switching between the auxiliary port 41 and the drain port 45 are achieved by displacement of the input switching land 21 and the F/B land 23.

Concrete switching timing is as described below. When the pressure control valving element 12 is displaced from the stop position to the right of the drawing, the following takes place at the oil supply start time "B": the state of communication between the input port 14 and the auxiliary port 41 is switched from a communicated state to an uncommunicated state; and the state of communication between the auxiliary port 41 and the drain port 45 is switched from an uncommunicated state to a communicated state.

When the pressure control valving element 12 is displaced from the right of the drawing to the stop position, the following takes place at the filling end time "C": the state of communication between the input port 14 and the auxiliary port 41 is switched from an uncommunicated state to a communicated state; and the state of communication between the auxiliary port 41 and the drain port 45 is switched from a communicated state to an uncommunicated state.

Figure 23:
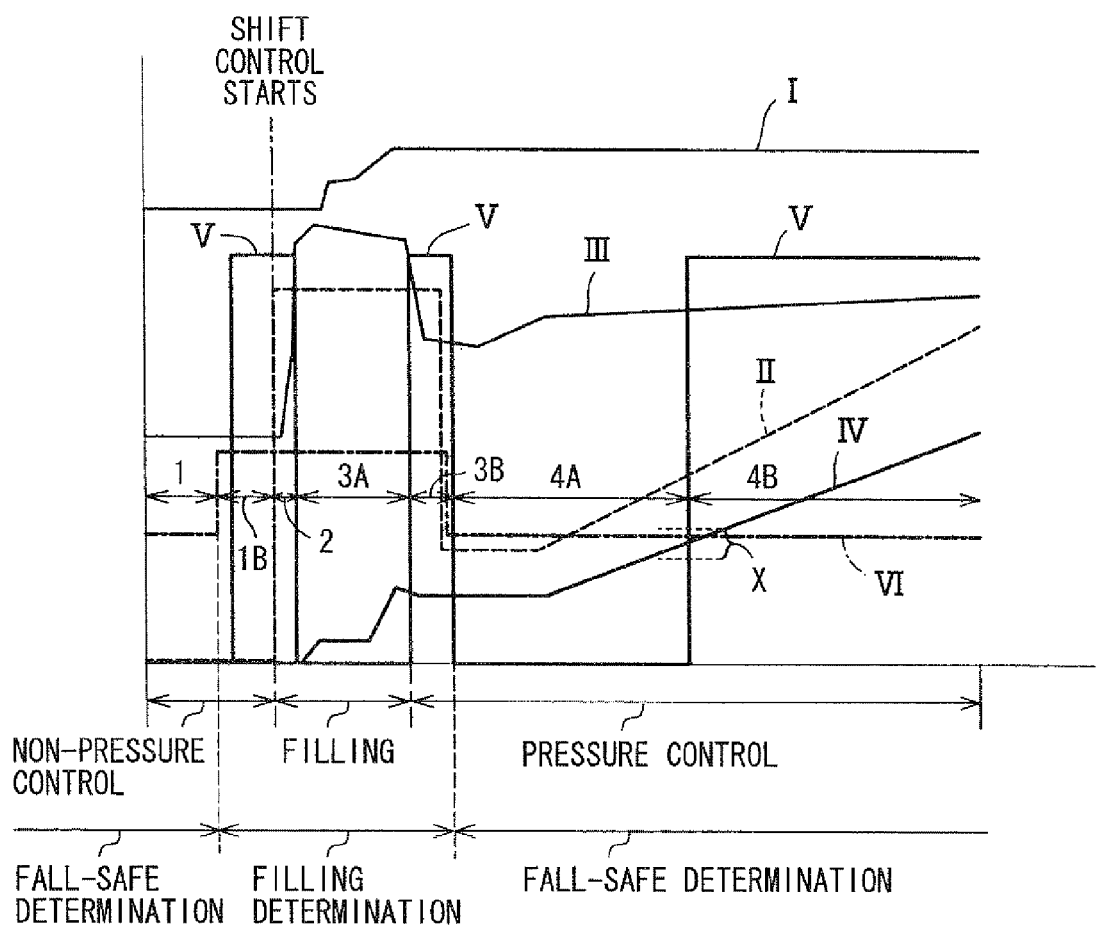
FIG. 23 is a time diagram explaining operation (fourth embodiment)
Figure 24:
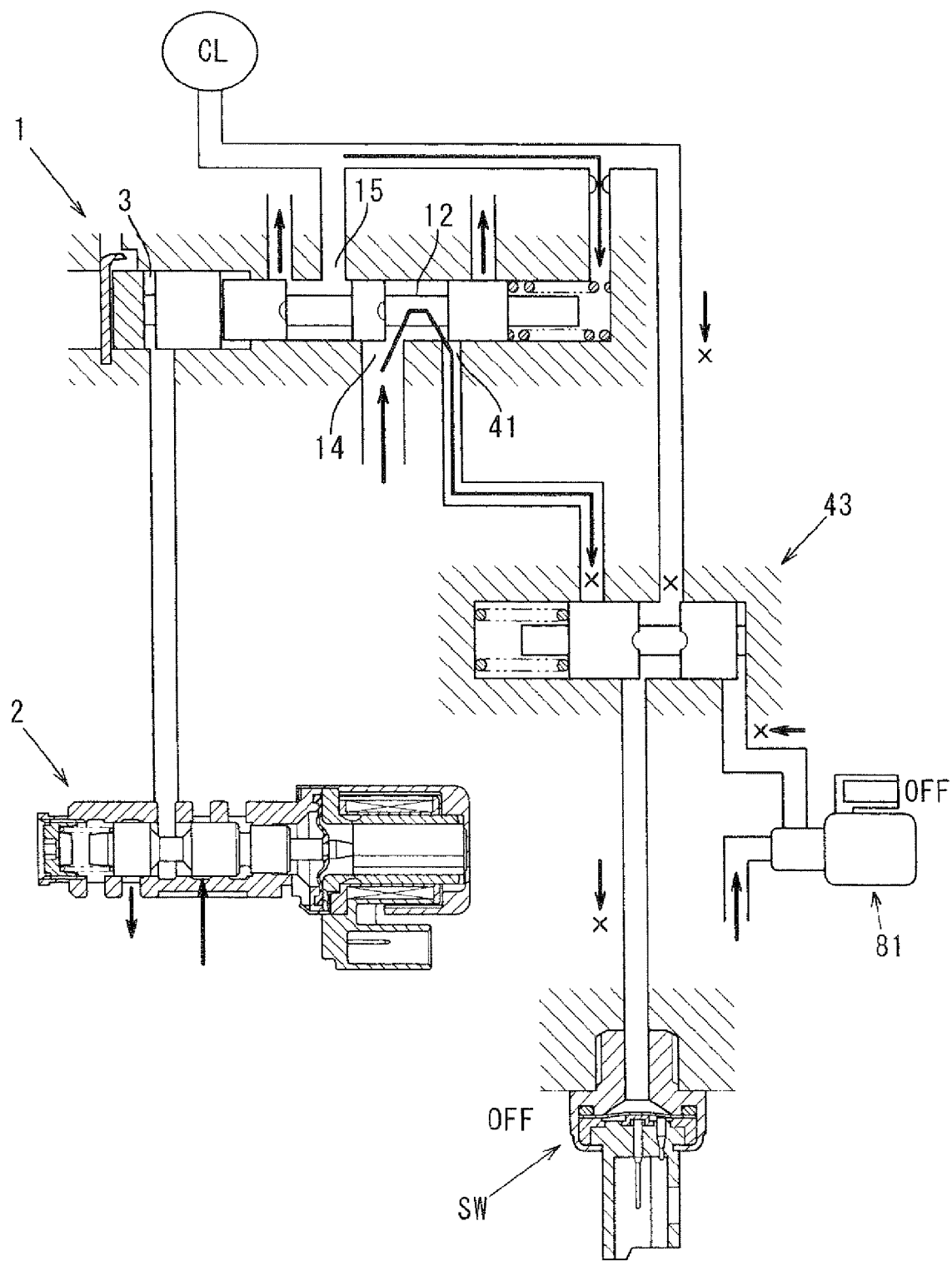
FIG. 24 is a circuit diagram of the hydraulic circuit in a stopped state (fourth embodiment)
Figure 25:
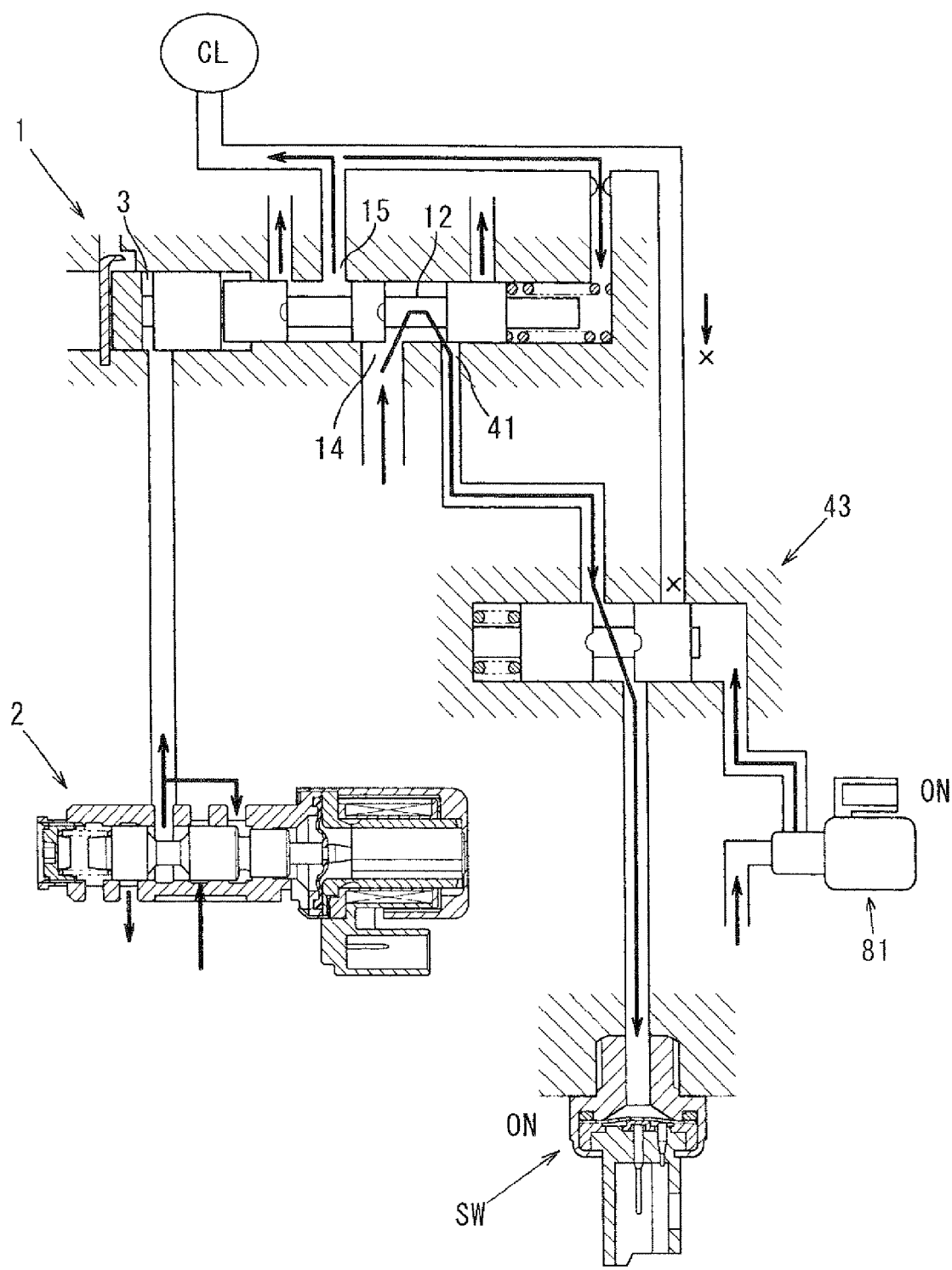
FIG. 25 is a circuit diagram of the hydraulic circuit immediately before shift control (fourth embodiment)
Figure 26:
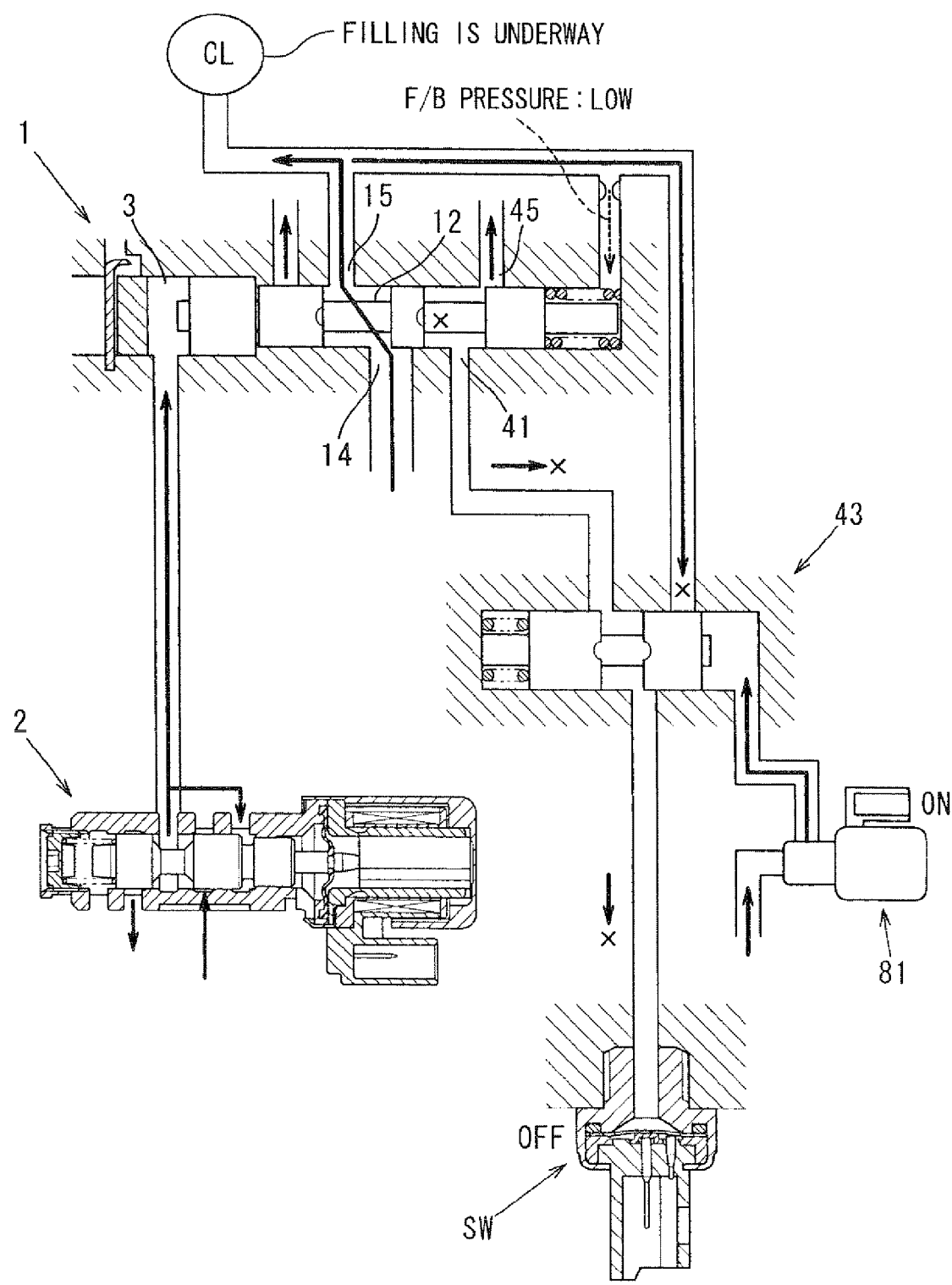
FIG. 26 is a circuit diagram of the hydraulic circuit when supply of driving oil pressure is started (fourth embodiment)
Figure 27:
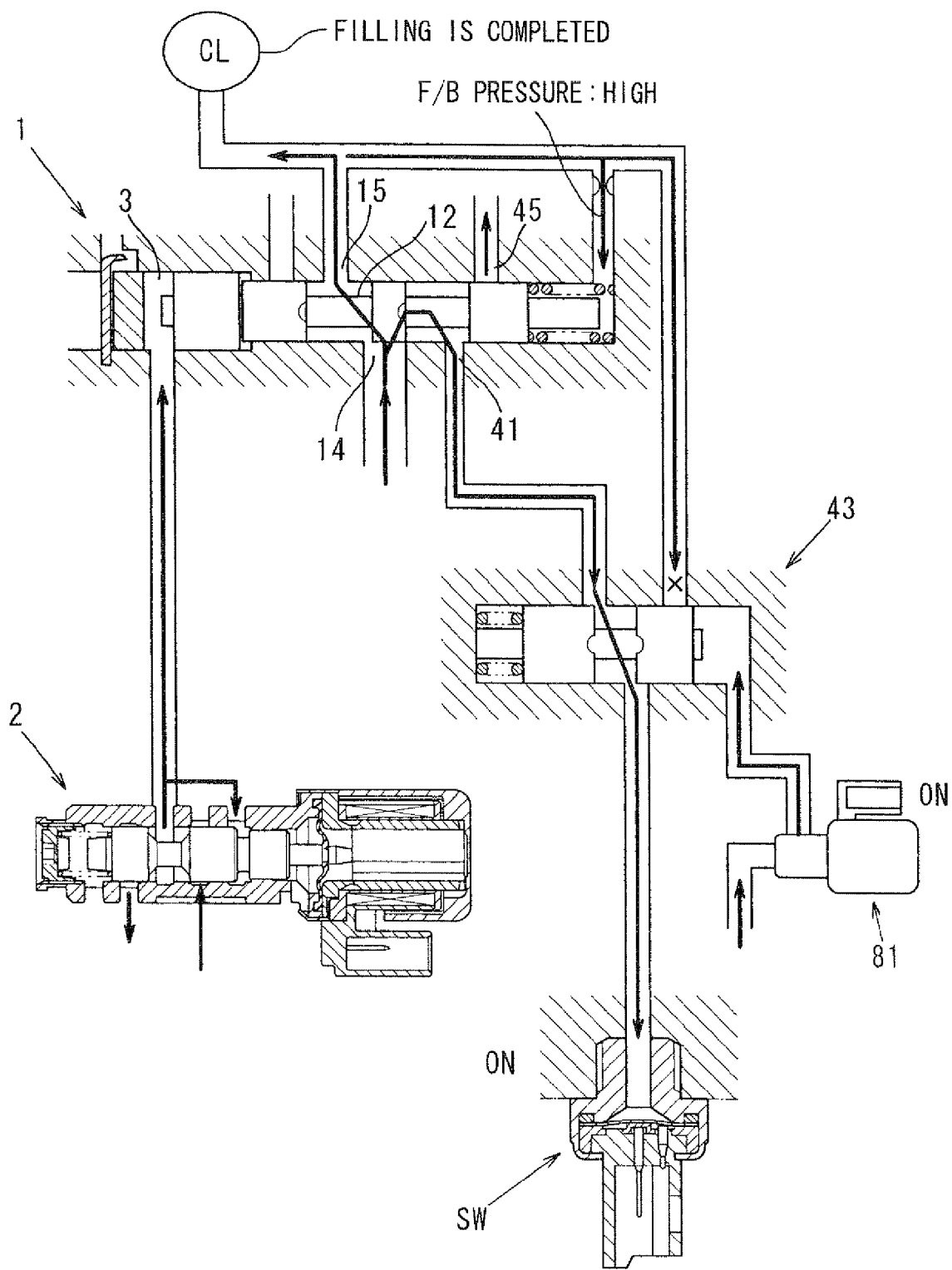
FIG. 27 is a circuit diagram of the hydraulic circuit when filling is completed (fourth embodiment)

Description will be given to an example of the operation of the fourth embodiment with reference to the time diagram in FIG. 23 and the operation explaining drawings in FIG. 24 to FIG. 29. The solid line "VI" in FIG. 23 indicates the on/off state of the electromagnetic hydraulic changeover valve 81.

(Stop State: Refer to "1a" in FIG. 23 and FIG. 24)

When the TCU disengages the friction device CL, the TCU is in such a state that the TCU has turned off the pilot valve 2. At this time, the valve driving oil chamber 3 is brought into a pressure exhaust state, and the pressure control valving element 12 is stopped in the stop position. The output port 15 is brought into a pressure exhaust state, and the friction device CL is kept disengaged.

At this time, there is communication between the input port 14 and the auxiliary port 41 and high auxiliary oil pressure has been generated at the auxiliary port 41. However, the high auxiliary oil pressure is not supplied to the oil pressure switch SW because the electromagnetic hydraulic changeover valve 81 was turned off and the pressure changeover valve 43 has been switched to the fail-safe determination side. Since the output port 15 is in a pressure exhaust state, the driving oil pressure supplied to the oil pressure switch SW is low (oil pressure: 0). For this reason, the oil pressure switch SW is off.

(Immediately Before Shift Control: Refer to "1b" in FIG. 23 and FIG. 25)

When the TCU determines to execute the engagement of the friction device CL, the TCU turns on the electromagnetic hydraulic changeover valve 81 immediately before the shift control start time "A".

When the electromagnetic hydraulic changeover valve 81 is turned on, the pressure changeover valve 43 is switched to the filling determination side. The high auxiliary oil pressure supplied to the auxiliary port 41 is supplied to the oil pressure switch SW and the oil pressure switch SW is turned on.

(Start of Shift Control: Refer to "2" in FIG. 23)

When the TCU determines to execute the engagement of the friction device CL and the TCU starts shift control at the shift control start time "A", the TCU fully energizes the pilot valve 2 at the shift control start time "A". As a result, pilot oil pressure is quickly supplied form the pilot valve 2 to the valve driving oil chamber 3 and displacement of the pressure control valving element 12 is started.

(Start of Driving Oil Pressure Supply: Refer to "3a" in FIG. 23 and FIG. 26)

The pressure control valving element 12 starts to move to the right of the drawing. When the degree of communication between the input port 14 and the output port 15 starts to be increased, the supply of driving oil pressure to the friction device CL is started.

When the displacement position of the pressure control valving element 12 reaches a position equivalent to the oil supply start time "B", the communication between the input port 14 and the auxiliary port 41 is blocked and instead the auxiliary port 41 communicates with the drain port 45. As a result, the oil pressure switch SW is turned off, and the oil supply start time "B" can be detected at the TCU.

(Completion of Filling: Refer to "3b" in FIG. 23 and FIG. 27)

When filling of oil pressure in the friction device CL progresses ad the driving oil pressure supplied to the friction device CL is increased, the following takes place: the pressure control valving element 12 is pushed back to the left side (valve closing side) of the drawing by increase in F/B oil pressure and the drain port 45 is closed. The input port 14 and the auxiliary port 41 communicate with each other again. As a result, high auxiliary oil pressure is generated at the auxiliary port 41. The oil pressure switch SW is turned on, and the filling end time "C" can be detected at the TCU.

Figure 28:
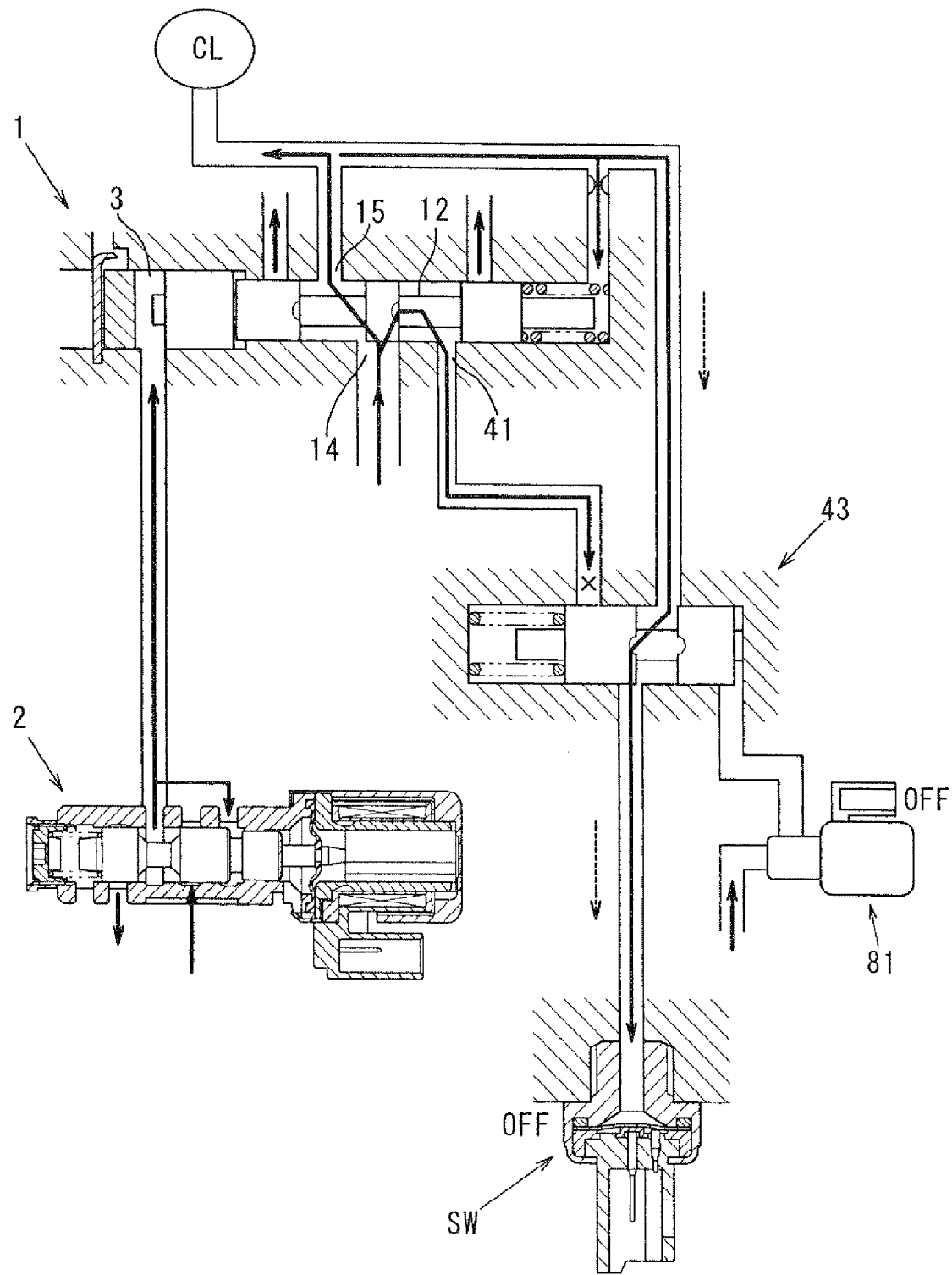
FIG. 28 is a circuit diagram of the hydraulic circuit immediately after the completion of filling (fourth embodiment)
Figure 29:
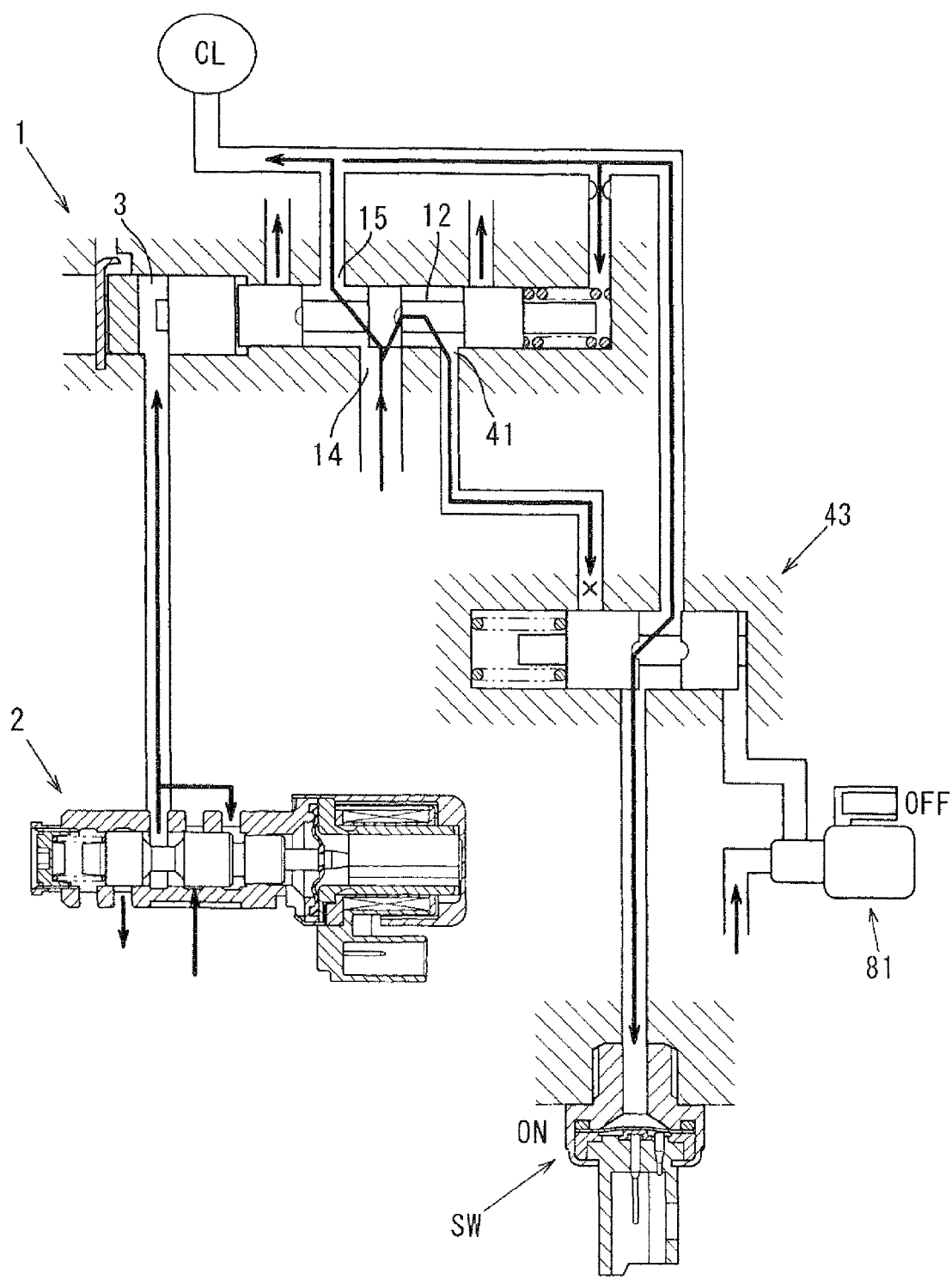
FIG. 29 is a circuit diagram of the hydraulic circuit when engagement is achieved (fourth embodiment)
Figure 30B:
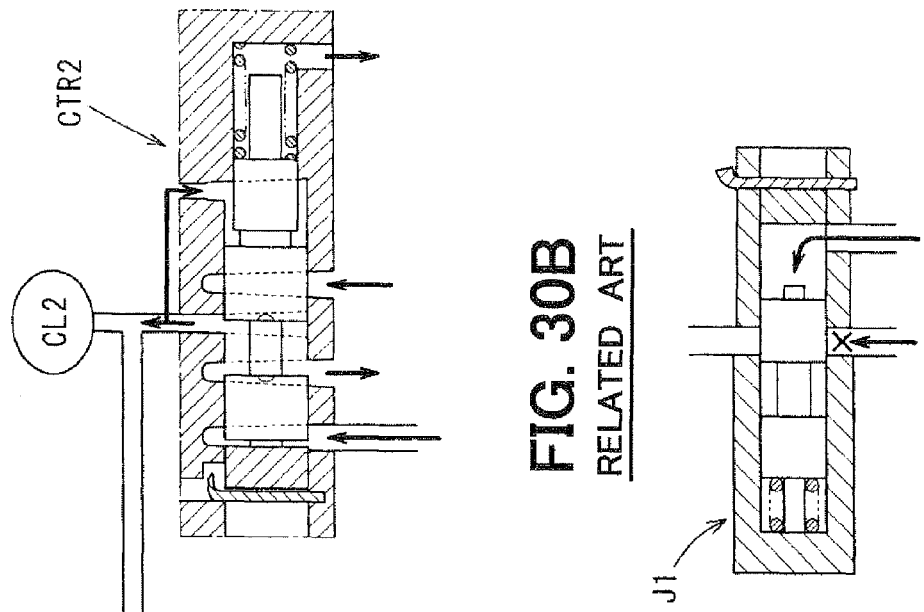
FIGS. 30A and 30B are circuit diagram of a hydraulic circuit that implements mechanical fail-safe (Related Art 1)
Figure 30A:
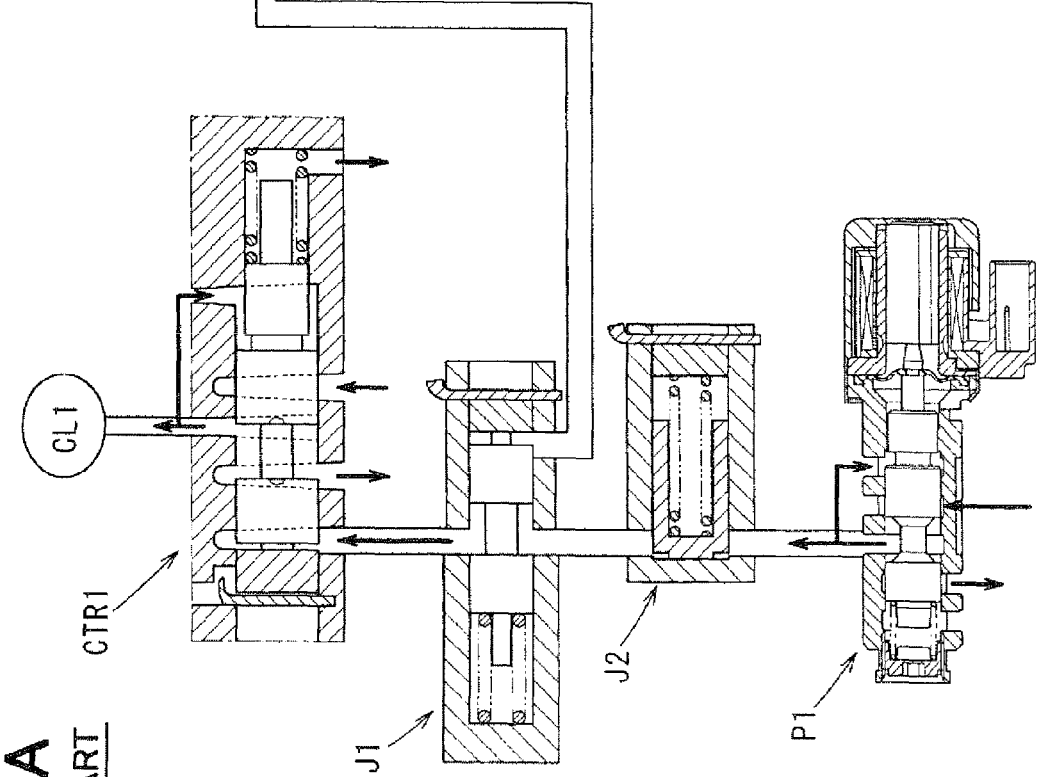
Figure 31:
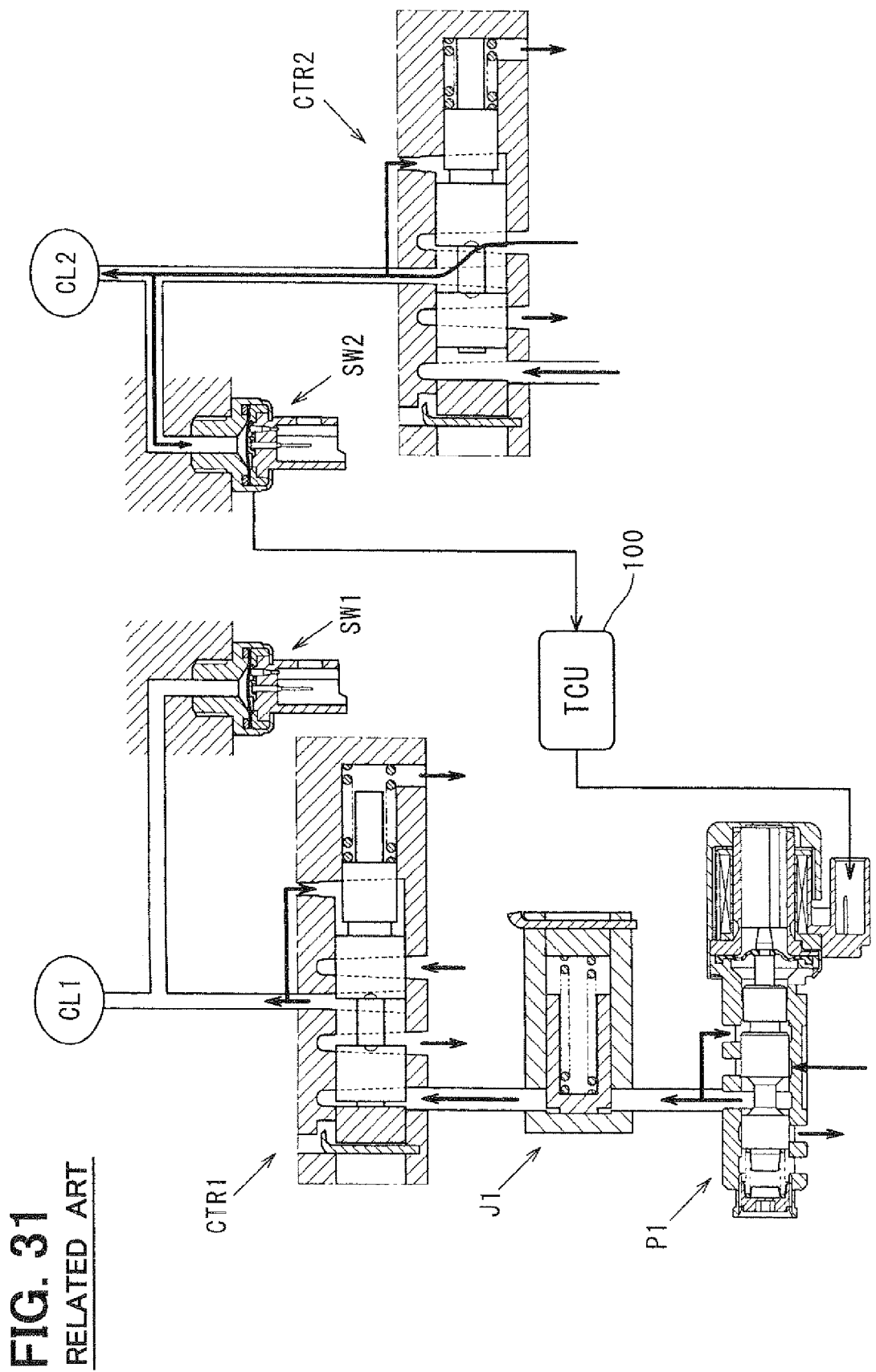
FIG. 31 is a circuit diagram of a hydraulic circuit that implements electrical fail-safe (Related Art 2)

(Immediately after Completion of Filling: Refer to FIG. 28)

When the filling end time "C" is detected as the result of the oil pressure switch SW being turned on for the second time, the TCU turns off the electromagnetic hydraulic changeover valve 81 to switch the pressure changeover valve 43 to the fail-safe determination side. As a result, the oil pressure supplied to the oil pressure switch SW is switched to the driving oil pressure supplied to the friction device CL.

At this time, the driving oil pressure is at a level immediately before engagement of the friction device CL is started and has not reached a level at which engagement is achieved. For this reason, the oil pressure switch SW is switched from on to off in preparation for fail-safe determination.

(Immediately Before Engagement: Refer to "4a" in FIG. 23)

After the operation of filling the driving oil pressure in the friction device CL is completed (engagement has not been achieved yet), the TCU carries out the following control to smoothly engage the friction device CL: the TCU reduces the command current for the pilot valve 2 and subsequently gradually increases the command current for the pilot valve 2 to raise pilot oil pressure.

(Achievement of Engagement: Refer to "4b" in FIG. 23 and FIG. 29)

When the filling of oil pressure in the friction device CL further progresses and the driving oil pressure supplied to the friction device CL reaches an engaging oil pressure, the following takes place: the oil pressure switch SW is switched from off to on and the engagement detection time "E" can be detected at the TCU.

(Modifications)

In the description of the above embodiments, an oil pressure control valve of N/L type is taken as an example of the oil pressure control valve 1. Instead, the oil pressure control valve 1 may be of N/H (Normally High) type.

In the description of the above embodiments, a pilot valve of N/L type is taken as an example of the pilot valve 2. Instead, the pilot valve 2 may be of N/H type.

In the description of the above embodiments, cases where the oil pressure control valve 1 is driven by the output of the pilot valve 2 have been taken as examples. Instead, the oil pressure control valve 1 may be an electromagnetic oil pressure control valve directly driven by an electric actuator (for example, an electromagnetic actuator).

In the description of the above embodiments, cases where the invention is applied to an oil pressure control valve 1 used in the hydraulic control unit of an automatic transmission have been taken as examples. Instead, the invention may be applied to any hydraulic control unit other than those of automatic transmissions.

What is claimed is:

1. A hydraulic control unit comprising:
   an oil pressure control valve having an output port for generating a driving oil pressure corresponding to a displacement position of a pressure control valving element and an auxiliary port for outputting an auxiliary oil pressure related to the displacement position of the pressure control valving element;
   an oil pressure switch operated in accordance with a supplied oil pressure; and
   a pressure changeover valve changing the oil pressure supplied to the oil pressure switch between a driving oil pressure outputted from the output port and an auxiliary oil pressure outputted from the auxiliary port.

2. A hydraulic control unit according to claim 1, wherein the pressure changeover valve is switched by auxiliary oil pressure outputted from the auxiliary port.

3. A hydraulic control according to claim 1, wherein the pressure changeover valve is switched by driving oil pressure outputted from the output port.

4. A hydraulic control unit according to claim 1, wherein the pressure changeover valve is switched by a dedicated actuator switching the pressure changeover valve.

* * * * *